(12) United States Patent
Tamai et al.

(10) Patent No.: US 8,875,264 B2
(45) Date of Patent: *Oct. 28, 2014

(54) SYSTEM, METHOD AND PROGRAM FOR OFF-LINE TWO-FACTOR USER AUTHENTICATION

(75) Inventors: Shigetomo Tamai, Tokyo (JP); Toru Takano, Tokyo (JP); Tsuyoshi Kobayashi, Tokyo (JP)

(73) Assignee: CSE Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/520,177

(22) PCT Filed: Oct. 5, 2010

(86) PCT No.: PCT/JP2010/067472
§ 371 (c)(1),
(2), (4) Date: Jun. 29, 2012

(87) PCT Pub. No.: WO2012/046303
PCT Pub. Date: Apr. 12, 2012

(65) Prior Publication Data
US 2013/0185778 A1 Jul. 18, 2013

(51) Int. Cl.
*G06F 21/00* (2013.01)
*H04L 9/08* (2006.01)
*H04L 29/06* (2006.01)
*H04L 9/32* (2006.01)
*G06F 21/36* (2013.01)

(52) U.S. Cl.
CPC .............. *H04L 63/08* (2013.01); *H04L 9/0863* (2013.01); *H04L 9/3228* (2013.01); *H04L 63/0838* (2013.01); *G06F 21/36* (2013.01)
USPC .................. 726/6; 713/168; 713/182; 726/3; 726/4; 726/7

(58) Field of Classification Search
CPC . H04L 63/08; H04L 63/0838; H04L 2209/56; H04L 2209/80; H04L 9/3226; H04L 9/3271; H04L 9/0863; G06F 21/36

USPC .......................... 726/2–7; 713/168, 182–186
See application file for complete search history.

(56) References Cited

U.S. PATENT DOCUMENTS

2005/0021975 A1* 1/2005 Liu ............................... 713/182
2005/0129242 A1 6/2005 Glickman
(Continued)

FOREIGN PATENT DOCUMENTS

GB 2 433 147 A 6/2007
JP 2007-264839 A 10/2007
(Continued)

OTHER PUBLICATIONS

PCT International Search Report for PCT Application No. PCT/JP2010/067473, (Nov. 2, 2010) 4 pgs.
(Continued)

*Primary Examiner* — Fikremariam A Yalew
*Assistant Examiner* — Kendall Dolly
(74) *Attorney, Agent, or Firm* — Blakely, Sokoloff, Taylor & Zafman LLP

(57) ABSTRACT

Provided is an off-line two-factor user authentication system. The off-line two-factor user authentication system is designed to use, as a password, a one-time-password derivation rule to be applied to certain pattern elements included in a presentation pattern at specific positions so as to create a one-time password, and further use, as a second authentication factor, information identifying a client to be used by a user. A plurality of pattern seed values each adapted to uniquely specify a presentation pattern in combination with a client ID, and a plurality of verification codes corresponding to respective ones of the pattern seed values, are stored in an off-line two-factor authentication client. A presentation pattern is created based on a selected one of the pattern seed values and a client ID, and an entered one-time password is verified based on a verification code corresponding to the selected pattern seed value.

13 Claims, 9 Drawing Sheets

(56) References Cited

U.S. PATENT DOCUMENTS

| | | | |
|---|---|---|---|
| 2005/0268107 A1* | 12/2005 | Harris et al. | 713/182 |
| 2006/0282660 A1* | 12/2006 | Varghese et al. | 713/155 |
| 2007/0226784 A1* | 9/2007 | Ueda et al. | 726/5 |
| 2007/0234063 A1 | 10/2007 | Ueda et al. | |
| 2008/0046366 A1 | 2/2008 | Bemmel et al. | |
| 2009/0063850 A1* | 3/2009 | Joram et al. | 713/155 |
| 2009/0183246 A1 | 7/2009 | Kokologiannakis | |
| 2009/0249069 A1* | 10/2009 | Daskalopoulos et al. | 713/169 |
| 2010/0043063 A1 | 2/2010 | Ueda et al. | |
| 2011/0202981 A1 | 8/2011 | Tamai et al. | |
| 2011/0307642 A1 | 12/2011 | Yamasaki | |
| 2013/0185779 A1 | 7/2013 | Tamai et al. | |

FOREIGN PATENT DOCUMENTS

| | | | |
|---|---|---|---|
| JP | 2007-272364 A | | 10/2007 |
| JP | 2007272364 A | * | 10/2007 |
| JP | 2009-223387 A | | 10/2009 |
| JP | 2010-034967 A | | 2/2010 |
| JP | 2010-097512 A | | 4/2010 |
| JP | 2010097512 A | * | 4/2010 |
| WO | WO 2009/113286 A1 | | 9/2009 |

OTHER PUBLICATIONS

PCT Written Opinion of the International Searching Authority for PCT Application No. PCT/JP2010/067473, (Nov. 2, 2010) 6 pgs.

Non-Final Office Action for U.S. Appl. No. 13/520,178, mailed on Oct. 10, 2013.

Notice of Allowance for U.S. Appl. No. 13/520,178, mailed on Jan. 30, 2014.

Yang et al., "*Trusted Computing-Based Double Factor Authentication for Mobile Terminals*," 2010 International Symposium on Intelligence Information Processing and Trusted Computing; IEEE; 2010. pp. 683-685; 3 pages.

PCT International Search Report for PCT Counterpart Application No. PCT/JP2010/067472 containing Communication relating to the Results of the International Search Report, 5 pgs., (Nov. 2, 2010).

PCT Written Opinion of the International Searching Authority for PCT Counterpart Application No. PCT/JP2010/067472, 10 pgs., (Nov. 2, 2010).

Office Action for Japanese Patent Application No. 2010-545126, 3 pgs., (Dec. 22, 2010).

Extended European Search Report for EP Counterpart Patent Application No. 10858111.7, 8 pgs. (Jun. 20, 2014).

* cited by examiner

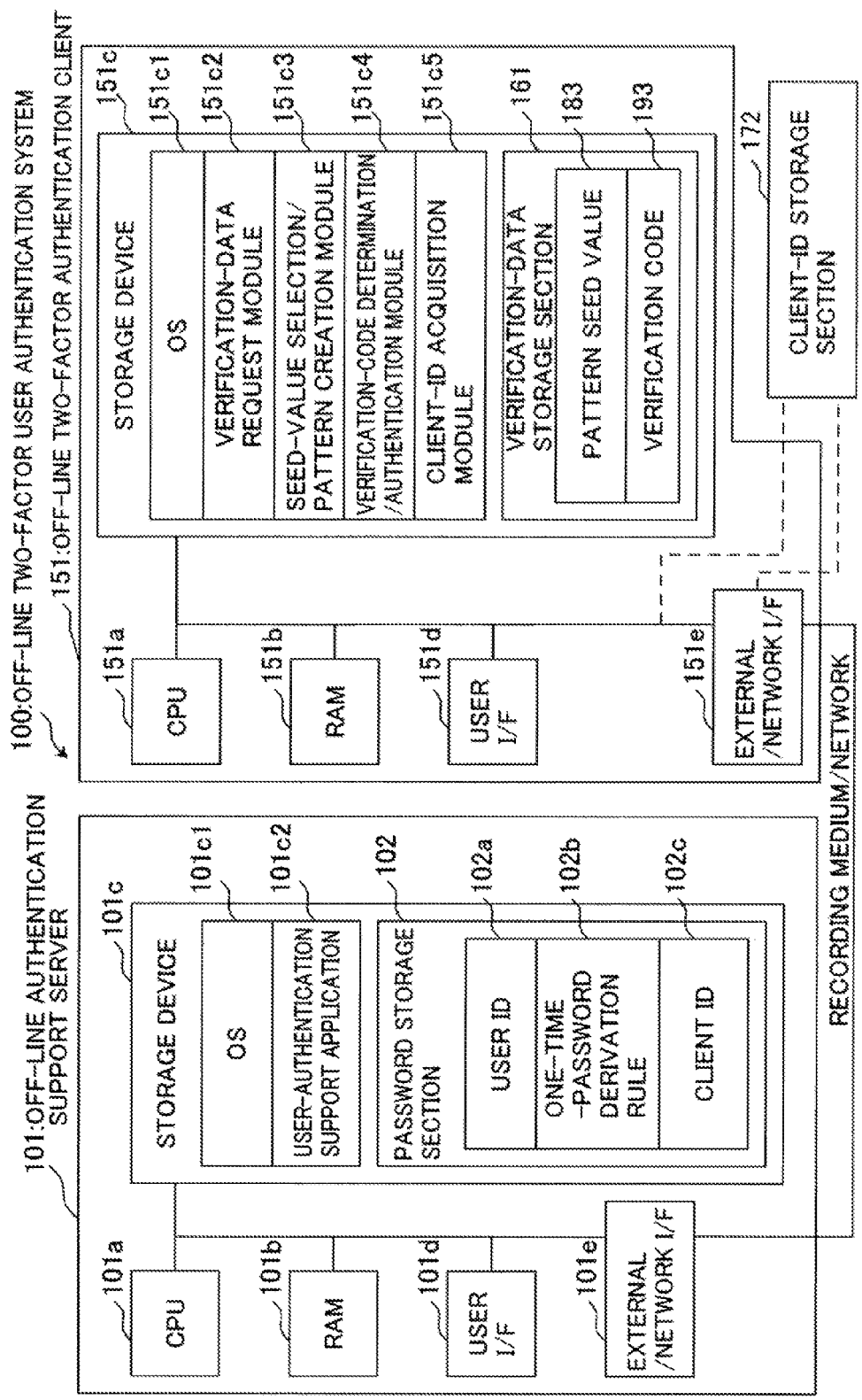

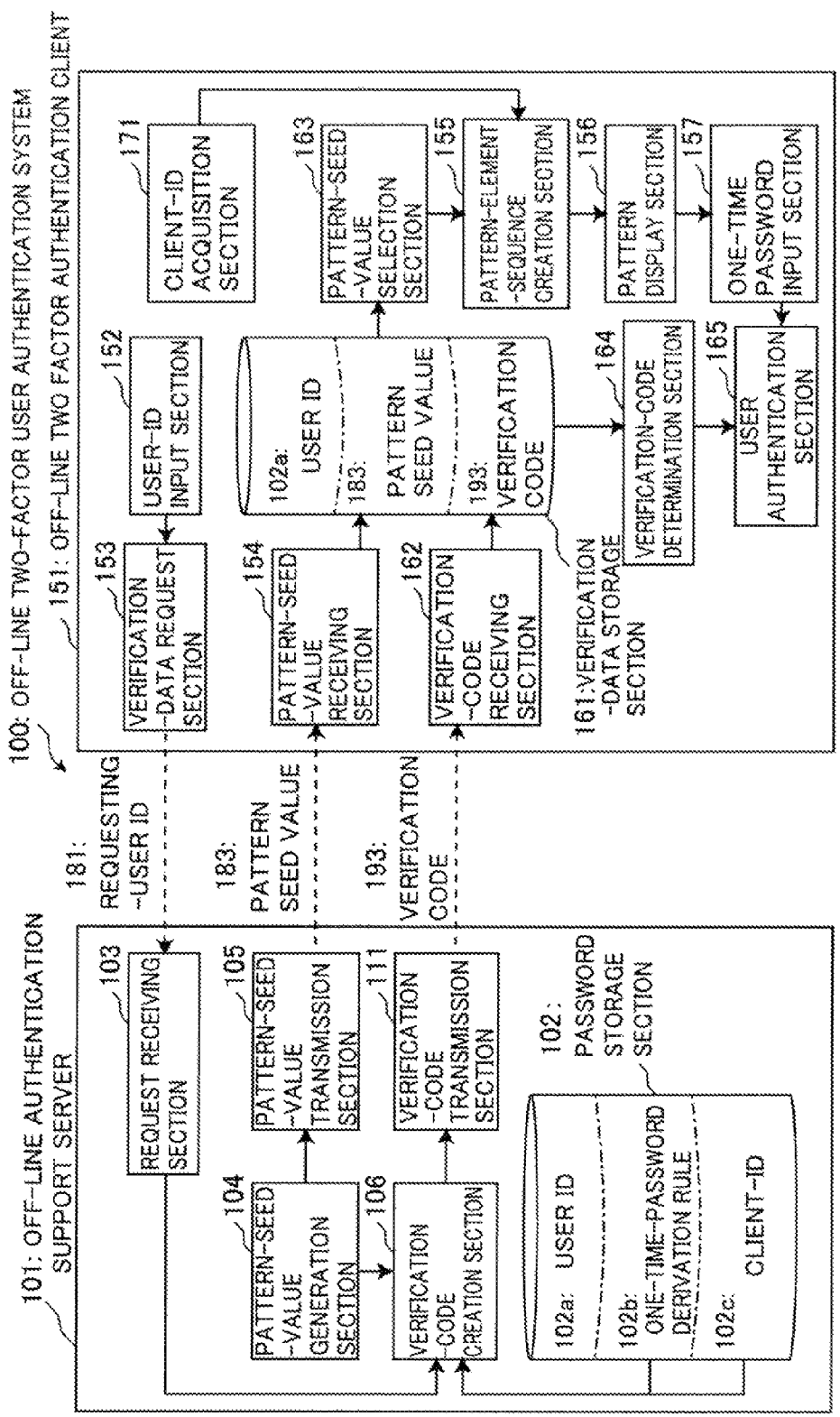

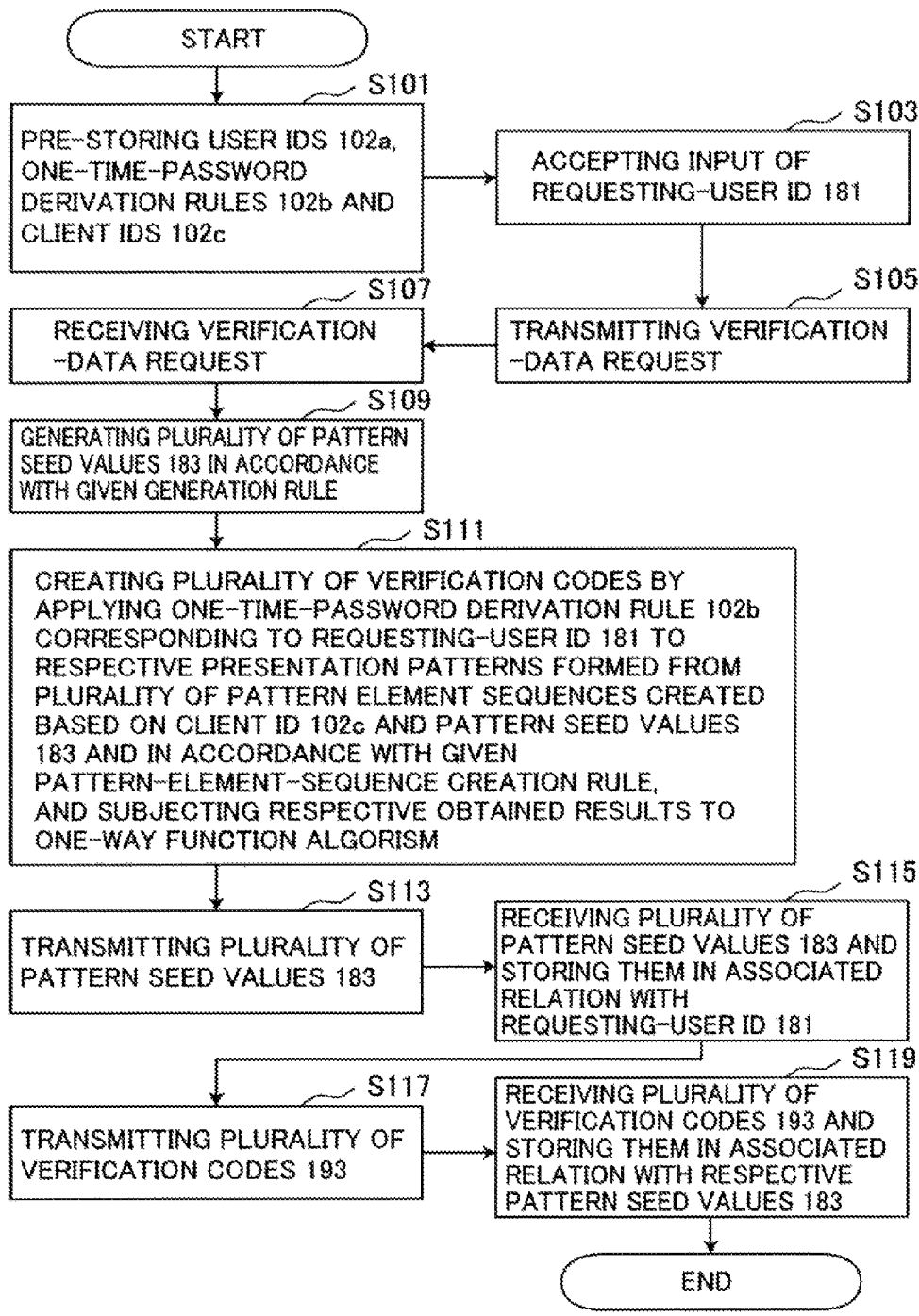

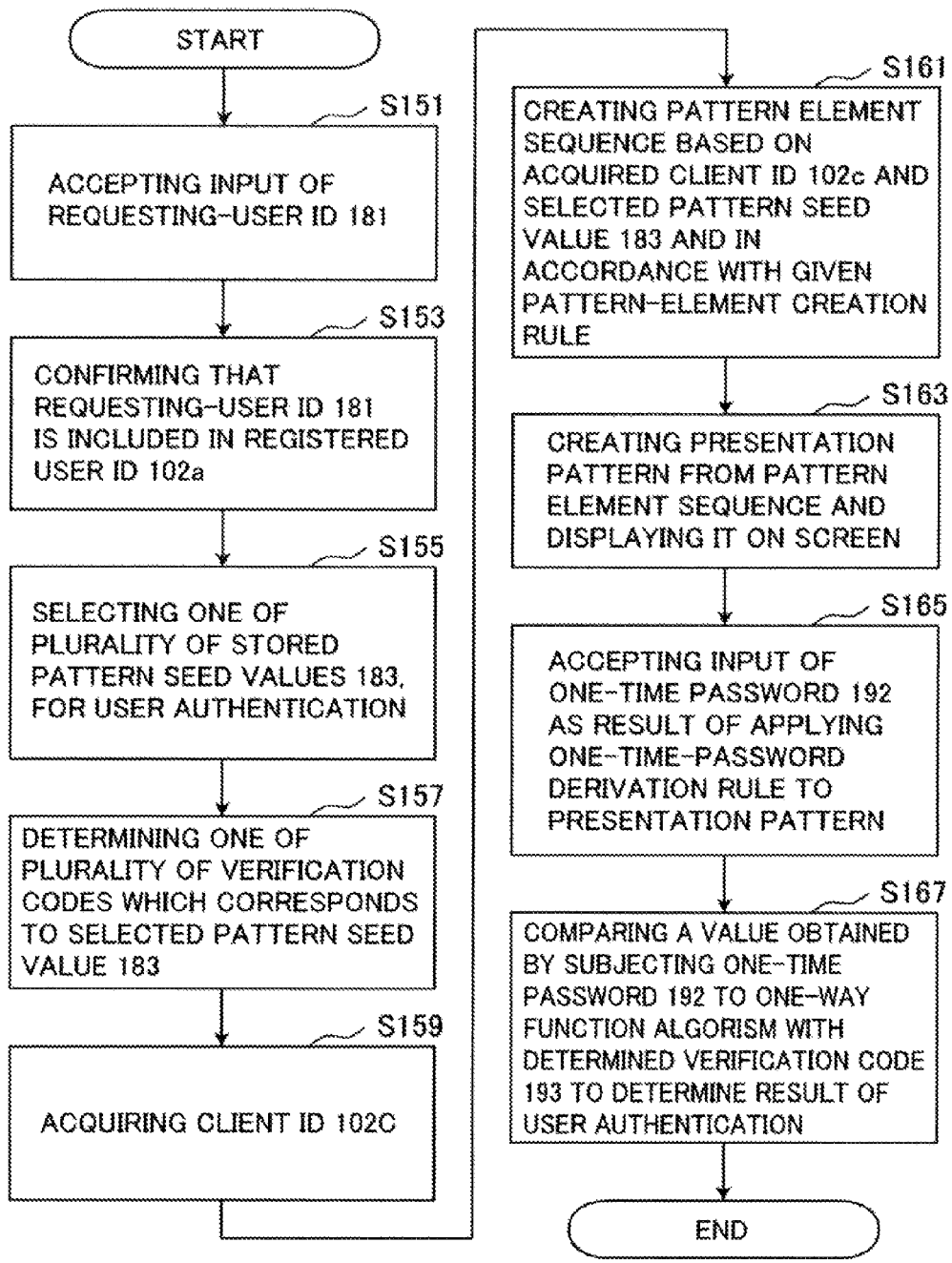

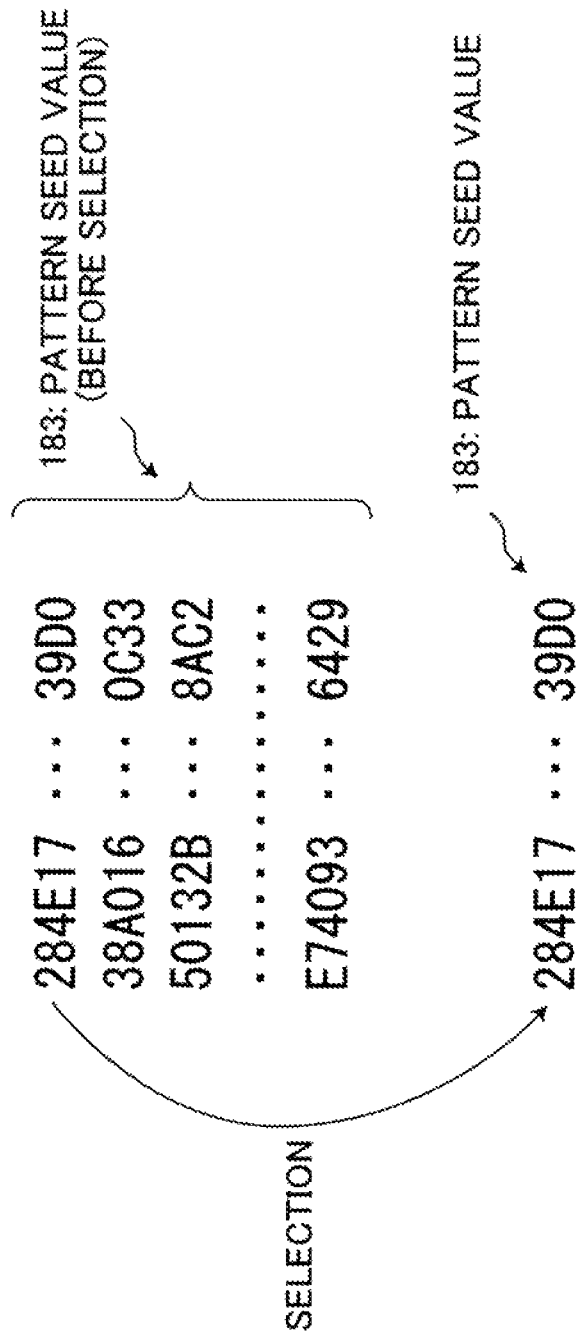

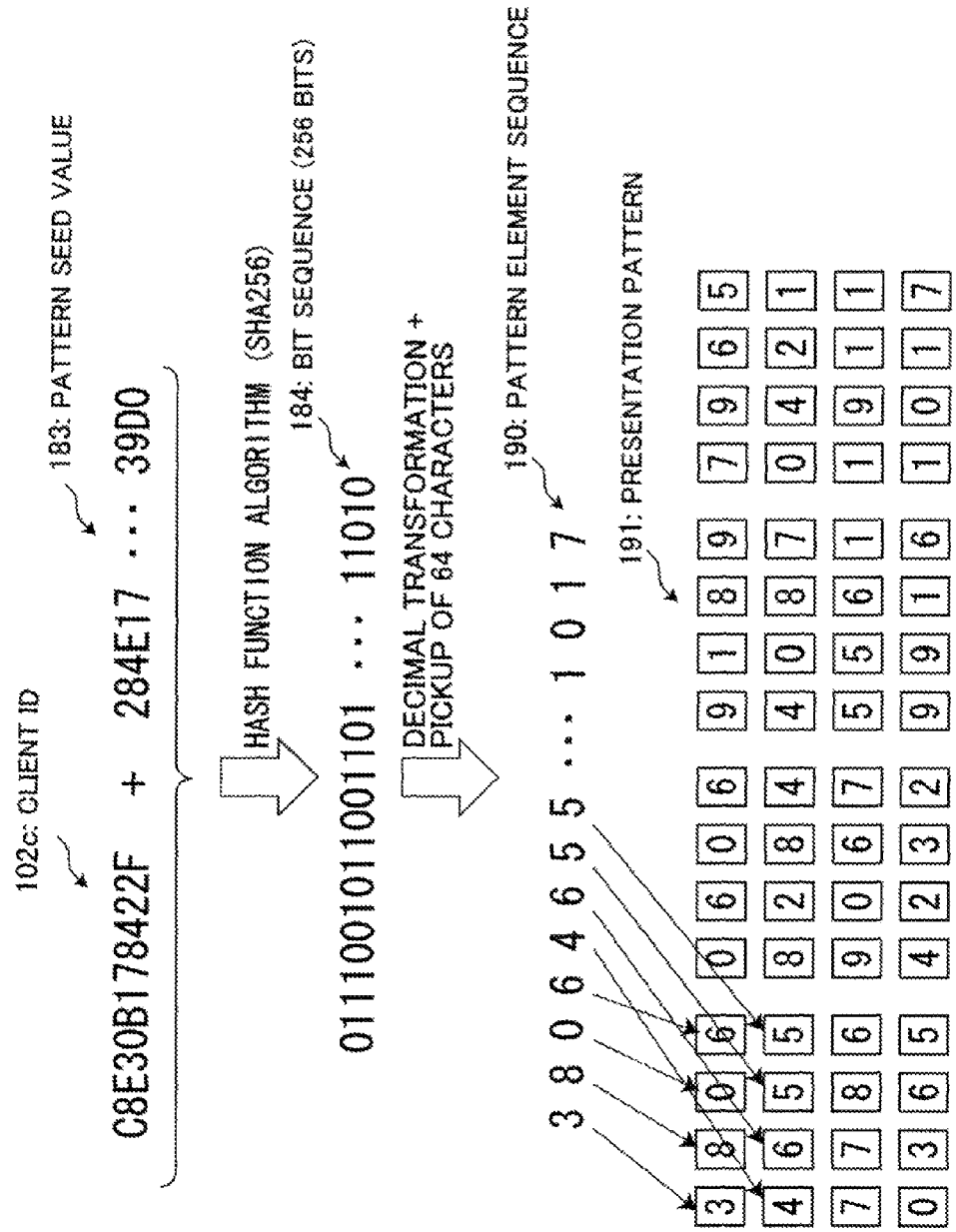

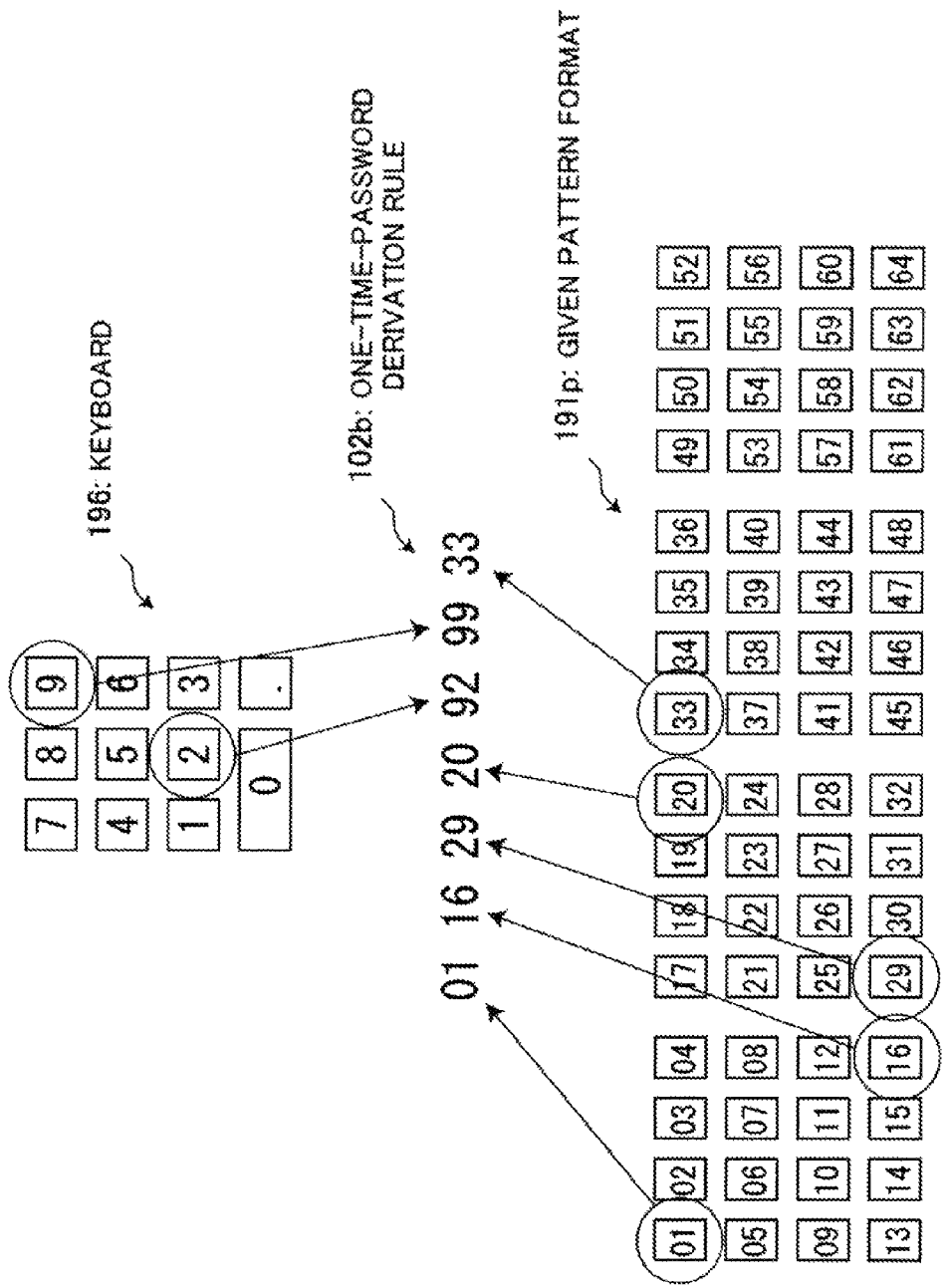

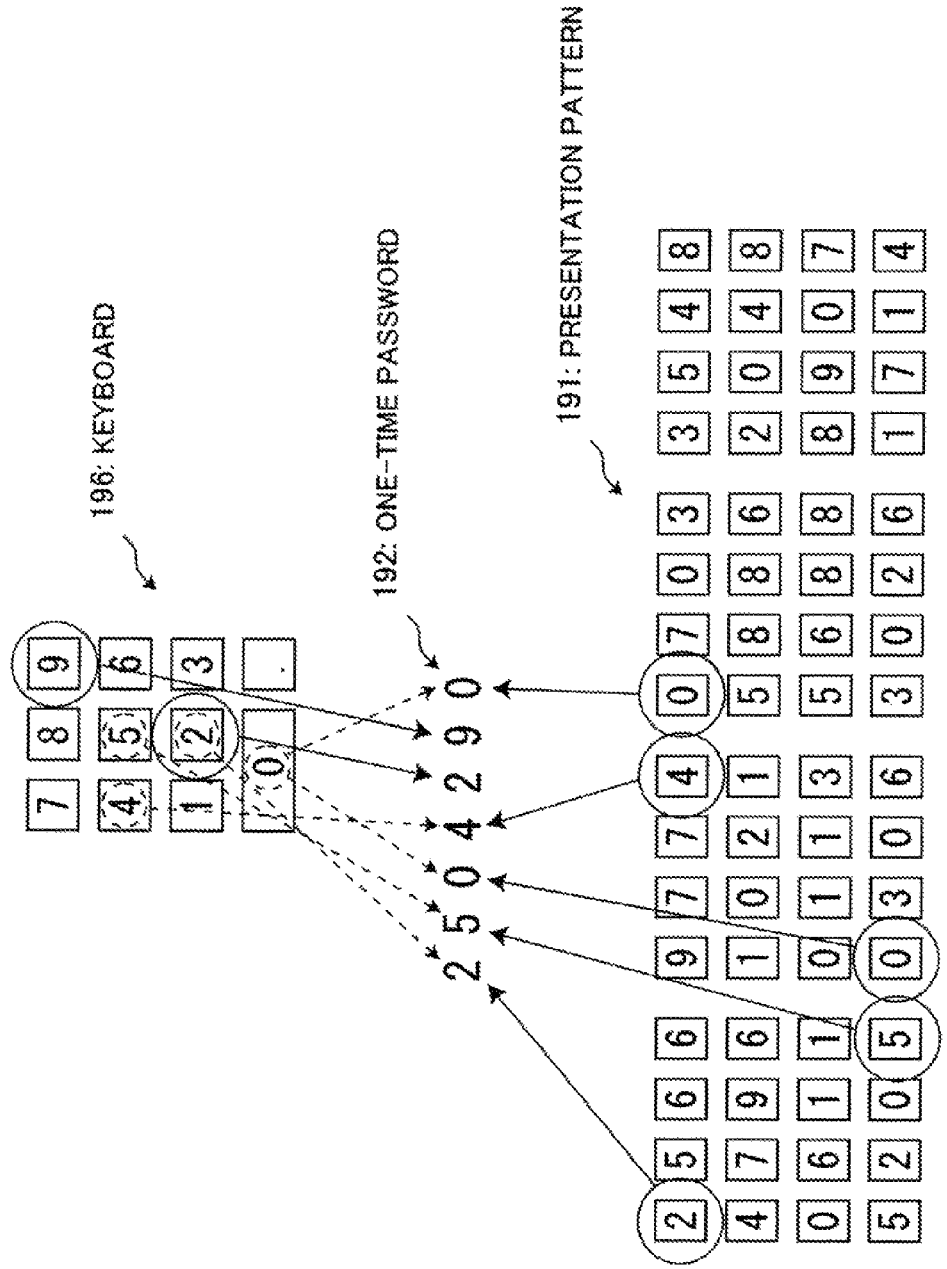

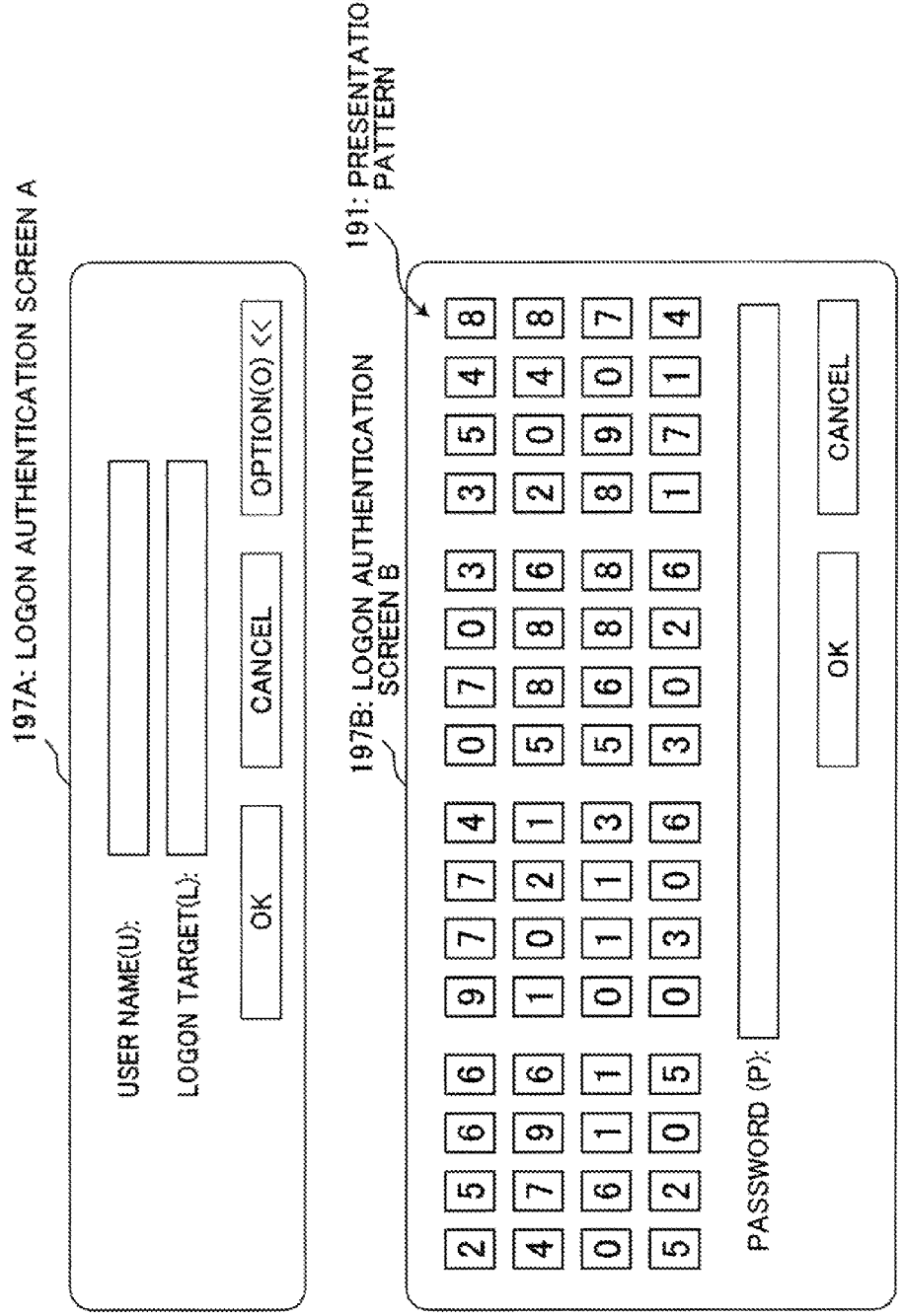

SYSTEM, METHOD AND PROGRAM FOR OFF-LINE TWO-FACTOR USER AUTHENTICATION

CROSS-REFERENCE TO RELATED APPLICATION

This patent application is a U.S. National Phase Application under 35 U.S.C. §371 of International Application No. PCT/JP2010/067472, filed Oct. 5, 2010.

TECHNICAL FIELD

The present invention relates to a user authentication system, and more specifically to a two-factor user authentication system designed to use a one-time-password derivation rule as a password of a user subject to authentication, in such a manner that a plurality of pattern elements are arranged in a given pattern format and presented as a presentation pattern to a client apparatus of the user, and the one-time-password derivation rule is applied to certain ones of the pattern elements included in the presentation pattern at specific positions, so as to create a one-time password, and further use information identifying the client apparatus such as hardware thereof, as a second authentication factor.

BACKGROUND ART

In user authentication systems, a one-time password-based system using a single-use password usable only once for user authentication purpose has become popular as one scheme having higher security than fixed password-based schemes. The one-time password-based system includes a token-based scheme using a token for creating a one-time password in accordance with a one-time-password generation rule synchronous with an authentication server, and a challenge/response scheme designed such that an authentication server transmits to a client a so-called "challenge" which is a value to be varied every time, and the client returns to the authentication server a response created by applying a client's fixed password to the challenge in accordance with a given rule. While the token-based scheme has an advantage of being able to reliably identify a user who owns a token, it forces the user to carry around the token, and has problems about cost of the token and security in the event of loss of the token. In this respect, the challenge/response scheme offers the convenience of being not necessary to use a token. On the other hand, due to a process of generating a one-time password using a client's fixed password which is highly likely to be analogized, the challenge/response scheme involves problems about poor protection against stealing during a password input operation and the need for installing dedicated software to allow a client to generate a response.

Late years, a new user authentication system has been developed based on a so-called "matrix Authentication®" scheme to improve the above problems in the conventional challenge/response scheme. This matrix authentication scheme is designed to arrange a plurality of random numbers in a given pattern format so as to create a matrix-form presentation pattern to be presented to a user requesting authentication, and apply a one-time-password derivation rule serving as a password of the user to certain pattern elements (a part of the random numbers) included in the presentation pattern so as to create a one-time password. Specifically, the presentation pattern is shared in common between a server and a client. Then, instead of a direct comparison of password, the sever carries out user authentication by comparing between a one-time password created on the client side as a result of applying the one-time-password derivation rule or the user's password to the presentation pattern, and a verification code created on the server side as a result of applying the one-time-password derivation rule or the user's password to the presentation pattern. In the matrix authentication scheme, a one-time-password derivation rule serving as a password is information about respective positions of certain pattern elements to be selected on a matrix-form presentation pattern and a selection order of the certain pattern elements, and characterized in that it is easily storable in the form of an image and cannot be figured out as a specific password even if being stolen during a password input operation.

Further, a system using the matrix authentication scheme in an off-line manner has also been developed (see, for example, the following Patent Document 1). In this off-line authentication system, a plurality of pattern seed values for creating a plurality of presentation patterns, and a plurality of verification codes corresponding to respective ones of the presentation patterns, are created and stored in an off-line authentication client, and a plurality of pattern element sequences and a plurality of verification codes are transmitted to the off-line authentication client. The off-line authentication client is operable to select one of the pattern seed values to display a corresponding one of the presentation patterns, and verify a one-time password entered based on the displayed presentation pattern so as to perform user authentication.

PRIOR ART DOCUMENTS

Patent Documents

Patent Document 1: JP 2007-272364A

SUMMARY OF THE INVENTION

Problem to be Solved by the Invention

However, the conventional off-line user authentication system can perform only single-factor authentication using a password of a user, which is information that the user knows. Thus, in the event of leakage of the user's password, it is impossible to avoid fraudulent authentication using the password, which means that there is a limit to security. For this reason, in view of enhancing security, there has been an increasing need for two-factor user authentication using information other than a password, as a second authentication factor. More specifically, there has been a need for, in addition to a password as information that an authentic user knows, using a new authentication factor, such as information indicative of possession of a certain device, or information indicating that a person requesting authentication is identical to the authentic user. However, even if information other than a password is simply added as an authentication factor, the information is likely to be accessed, which leads directly to leakage of the information. Thus, only a limited effect on improvement in security can be obtained. In cases where such information other than a password is created using a one-time-password token, the above risk can be reduced, whereas it is necessary to spend a lot of cost and effort to introduce one-time-password tokens for personal use, and an inconvenience is caused by a need to take along the one-time-password token every authentication.

Means for Solving the Problem

In view of the above problems, the present invention provides an off-line two-factor user authentication system designed to use a one-time-password derivation rule as a password of a user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions, so as to create a one-time password, and further use information identifying the client being used by the user, as a second authentication factor. The off-line two-factor user authentication system comprises an off-line authentication support server and a plurality of the clients each serving as an off-line two-factor authentication client. The off-line authentication support server is configured to pre-store respective user IDs of the users, respective one-time-password derivation rules of the users, and respective client IDs of the clients to be used by the respective users as the off-line two-factor authentication client, in associated relation with each other on a user-by-user basis, and operable to: generate, in accordance with a given generation rule, a plurality of pattern seed values each adapted to uniquely specify a presentation pattern in combination with one of the client IDs; apply the pre-stored one-time-password derivation rule associated with a user requesting authentication to respective presentation patterns formed based on the generated pattern seed values and the pre-stored client ID associated with the requesting user, and subject respective obtained results to a one-way function algorism to create a plurality of verification codes; and transmit the plurality of generated pattern seed values and the plurality of created verification codes to the off-line two-factor authentication client so as to allow them to be stored in the off-line two-factor authentication client. The off-line two-factor authentication client is operable to: acquire the client ID of the off-line two-factor authentication client when used by the requesting user; select one of the plurality of received pattern seed values and create a presentation pattern based on the acquired client ID and the selected pattern seed value; and compare a result of subjecting a one-time password entered based on the created presentation pattern to a one-way function algorithm with a corresponding one of the verification codes to perform user authentication.

In the present invention, when a presentation pattern is created based on the pattern seed value, it may be created based on a combination with a plurality of types of client IDs (client ID group).

Alternatively, in the present invention, in advance of creating a presentation pattern based on the pattern seed value, the user ID of the requesting user may be combined with the pattern seed value, in addition to the client ID.

The off-line two-factor user authentication system of the present invention may be configured to acquire, as the client ID, identification information about an external device through an interface of the off-line two-factor authentication client.

Alternatively, the off-line two-factor user authentication system of the present invention may be configured to acquire, as the client ID, identification information about an operating system of the off-line two-factor authentication client.

Alternatively, the off-line two-factor user authentication system of the present invention may be configured to acquire, as the client ID, a network address set for the off-line two-factor authentication client.

Alternatively, the off-line two-factor user authentication system of the present invention may be configured to acquire, as the client ID, biological identification information about the requesting user.

In the inventions described above or set forth in the appended claims, each of the terms "server" and "client" is not intended to express a device, apparatus or system having a specific configuration or function, but to express a device, apparatus or system having a typical function. Further, a function of a single component or claim-element may be achieved by two or more physical means, and a function of two or more components or claim-elements may be achieved by a single physical means. In the appended claims, a system claim may be recognized as a method or process claim defined such that respective functions of claim elements in the system claim are sequentially executed, and the opposite is true. It is understood that the steps defined in the method claim are not necessarily executed in order of description but may be executed in any suitable order allowing an intended function to be achieved in their entirety. The system and method of the present invention may be designed using a program capable of partly or entirely achieving the intended function in cooperation with given hardware, or a recording medium having the program recorded thereon.

Effect of the Invention

The off-line two-factor user authentication system of the present invention is designed to use a one-time-password derivation rule as a password of a user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions, so as to create a one-time password, and further use information identifying the client being used by the user, as a second authentication factor. The off-line two-factor authentication client is configured to store therein a plurality of pattern seed values each adapted to uniquely specify a presentation pattern in combination with a client ID, and a plurality of verification codes created by applying a one-time-password derivation rule to respective presentation patterns formed based on the pattern seed values and the client ID and subjecting respective obtained results to a one-way function algorism, and operable to select one of the plurality of stored pattern seed values and create a presentation pattern based on an acquired client ID and the selected pattern seed value; and compare a result of subjecting a one-time password entered based on the created presentation pattern to a one-way function algorithm with a corresponding one of the verification codes to perform user authentication. Thus, in addition to the user's password, which is information that the user knows, the client ID can be used as a second authentication factor, so that it becomes possible to achieve two-factor authentication in which a fact of physically possessing a device capable of outputting the client ID serves as an additional condition for verification during authentication. In addition, the client ID itself is not subjected to the verification during authentication, so that even if the verification code for authentication is leaked, it does not lead to leakage of the client ID as a second authentication factor. More specifically, even if the verification code for authentication is leaked, it is impossible to infer a presentation pattern and a one-time-password derivation rule, so that it becomes possible to eliminate a risk of inference of a proper one-time password to obtain strong security. As the device capable of outputting the client ID, a wide range of devices including the off-line two-factor authentication client itself may be used. This makes it possible to minimize the cost and effort for introducing the system, and minimize the burden of carrying around the device capable of outputting the client ID.

In the present invention, when a presentation pattern is created based on the pattern seed value, it may be created based on a combination with a plurality of types of client IDs (client ID group). In this case, the number of authentication factors can be substantially increased up to three or more so as to obtain stronger security.

Alternatively or additionally, in the present invention, in advance of creating a presentation pattern based on the pattern seed value, the user ID of the requesting user may be combined with the pattern seed value, in addition to the client ID. In this case, even if the pattern seed value is leaked, it becomes more difficult to infer a presentation pattern from the pattern seed value, so that it becomes possible to obtain stronger security.

The off-line two-factor user authentication system of the present invention may be configured to acquire, as the client ID, identification information incorporated in hardware of the off-line two-factor authentication client, or identification information about an operating system of the off-line two-factor authentication client, or a network address set for the off-line two-factor authentication client. In this case, information based on a fact of physically possessing the off-line two-factor authentication client serves as an additional condition for verification during authentication, so that the security is enhanced. Alternatively, the off-line two-factor user authentication system of the present invention may be configured to acquire, as the client ID, identification information about an external device through an interface of the off-line two-factor authentication client. In this case, a fact of physically possessing the external device serves as an additional condition for verification during authentication, so that security is enhanced. Alternatively, the off-line two-factor user authentication system of the present invention may be configured to acquire, as the client ID, biological identification information about the requesting user. In this case, biological information indicative of identity serves as an additional condition for verification during authentication, so that security is enhanced.

BRIEF DESCRIPTION OF THE DRAWINGS

FIG. 1 is a block diagram illustrating a hardware configuration of an off-line two-factor user authentication system 100 according to one embodiment of the present invention.

FIG. 2 is a block diagram illustrating a functional configuration of the off-line two-factor user authentication system 100.

FIG. 3 is a flowchart illustrating a verification-data acquisition operation in the off-line two-factor user authentication system 100.

FIG. 4 is a flowchart illustrating an off-line user authentication operation in the off-line two-factor user authentication system 100.

FIG. 5 is a conceptual diagram illustrating a process of creating a presentation pattern, in the off-line two-factor user authentication system 100.

FIG. 6 is a conceptual diagram illustrating the process of creating a presentation pattern, in the off-line two-factor user authentication system 100, which is continued from FIG. 5.

FIG. 7 is a conceptual diagram illustrating a one-time-password derivation rule in a matrix authentication scheme.

FIG. 8 is a conceptual diagram illustrating a process of entering a one-time password, in the matrix authentication scheme.

FIG. 9 is a schematic diagram illustrating an image on a Windows® logon authentication screen in the off-line two-factor user authentication system 100.

DETAILED DESCRIPTION

The present invention will now be described based on an embodiment thereof. To begin with, respective meanings of the terms "online", "off-line" will be described below. The term "online" means a state when a user is connected as an authorized or proper network user to a common network with an off-line authentication support server (101) by use of an off-line two-factor authentication client (151). In cases where a user uses the off-line two-factor authentication client (151) in an online state, it is necessary to obtain permission of the use of a resource of the network. For example, when the network is managed based on a domain configuration, it is necessary for the user to obtain authentication for logon to the domain network. The term "off-line" means a state when the off-line two-factor authentication client (151) is not connected to a common network with the off-line authentication support server (101) although a user uses the off-line two-factor authentication client (151) as a proper user. Even in the off-line state, it is possible to logon to a Windows® network as a domain network user or a local computer user. As a prerequisite to allowing a user to use the off-line two-factor authentication client (151) in the off-line state, it is necessary for the user to obtain authentication for logon to a domain network or computer thereof.

Secondly, an explanation of techniques unique to a matrix authentication scheme will be made below. The matrix authentication scheme is designed to use a one-time-password derivation rule 102b as a password of a user subject to authentication, in such a manner that a plurality of pattern elements (pattern element sequence 190) are arranged in a given pattern format and presented as a presentation pattern 191 to a client apparatus being used by the user, and the one-time-password derivation rule 102b is applied to certain ones of the pattern elements included in the presentation pattern 191 at specific positions, so as to create a one-time password.

(Presentation Pattern and Pattern Elements)

The presentation pattern 191 consists of a plurality of pattern elements arranged in a given pattern format. Typically, the given pattern format is a matrix comprised of a plurality of matrix elements arranged in m columns×n rows to form a rectangular shape in its entirety, or by arranging a plurality of the matrixes. Alternatively, it may be any other suitable graphic pattern. In this specification, an authentication scheme using a presentation pattern arranged in any pattern format other than the typical matrix form will also be referred to as "matrix authentication scheme". Preferably, the given pattern format is formed as an orderly pattern or an impressive pattern easily remaining in user's memory to allow a user to easily remember a one-time-password derivation rule 102b serving as a password of the user.

The term "pattern element" means an element to be arranged at a given position in the given patter format so as to constitute a presentation pattern. Preferably, the pattern element is selected from one-digit numerals 0 (zero) to 9. Alternatively, the pattern element may be any other suitable character, such as alphabet or symbol. As the symbol, it is particularly preferable to use "+", "−", "*", "=", "_", "!", "?", "#", "$" or "&" which is assigned to a standard keyboard for a personal computer (PC). The character may include a figure, such as graphic, illustration or photograph. Preferably, a single presentation pattern includes two or more same pattern elements. In this case, there is a many-to-one correspondence between a one-time-password derivation rule 102b serving as a password and a one-time password 192 created as a result of applying the one-time-password derivation rule 102b to the presentation pattern, which means that the one-time-password derivation rule 102b is automatically hashed during input of the one-time password 192. In other words, a processing similar to a hash function algorithm is automatically performed during input of the one-time password 192. Thus, even if the presentation pattern has already been figured out, the one-time-password derivation rule 102b cannot be figured out based on only one one-time password 192.

In this embodiment, as illustrated, for example, in FIG. 8, a presentation pattern 191 is created by arranging a plurality of pattern elements each selected from one-digit numerals 0 to 9, in a given pattern format 191p comprised of four 4-by-4 matrixes. In a client having a display screen with a small area, such as a portable phone, it is preferable to use a presentation pattern in which the number of 4-by-4 matrixes is reduced, for example, to three.

(Pattern Element Sequence)

The pattern element sequence 190 is data indicative of the content of a plurality of pattern elements to be arranged in the given pattern format 191p so as to create a presentation pattern 191. Typically, it is a sequence in which all of the pattern elements to be comprised in the presentation pattern 191 are arranged in order. The pattern element sequence 190 is created in advance of creating the presentation pattern 191. It should be noted that the pattern element sequence 190 is not limited to one character sequence created by arranging a plurality of pattern elements in order, but defined as data including information about all of a plurality of pattern elements to be comprised in a single presentation pattern 191. Thus, as long as the pattern elements to be comprised in the pattern element sequence 190 are associated with respective positions in a presentation pattern, the order of the pattern elements comprised in the pattern element sequence 190 may be freely set. Further, the pattern element sequence 190 may be divided into a plurality of data. An off-line two-factor user authentication system 100 according to one embodiment of the present invention roughly comprises an off-line authentication support server 101 for supporting off-line authentication of a plurality of users, and a plurality of clients each serving as an off-line two-factor authentication client 151 which is a terminal capable of authenticating each of the users in an off-line state of being not network-connected although being connectable to the off-line authentication support server via a network. In the off-line two-factor user authentication system 100, the pattern element sequence 190 is created in the off-line two-factor authentication client 151 and used for creating a presentation pattern 191 in the off-line two-factor authentication client 151. In other words, the pattern element sequence 190 is never transmitted via a network in its raw or untransformed form.

(One-Time-Password Derivation Rule)

The one-time-password derivation rule 102b is a rule to be applied to certain pattern elements included in a presentation pattern 191 at specific positions so as to create a one-time password 192, and is data serving as a password of a user. Typically, the "rule to be applied to certain pattern elements" is a rule for selecting certain pattern elements at specific positions in a specific order. In this embodiment, the one-time-password derivation rule 102b is information consisting of a combination of respective positions of certain ones to be selected from a plurality of pattern elements comprised in a presentation pattern 191, and a selection order of the certain pattern elements. The one-time-password derivation rule 102b may additionally include information about a fixed character, such as a fixed numeral, to be entered without being based on a presentation pattern 191. In this case, the one-time-password derivation rule 102b is information consisting of a combination of: respective positions of certain ones to be selected from the pattern elements comprised in the presentation pattern 191; at least one fixed character to be entered without being based on the presentation patter 191; and a selection or input order of the certain pattern elements and the fixed character. That is, a fixed password element which is not based on the presentation patter 191 may be included in a one-time password.

FIG. 7 illustrates a structure of a typical one-time-password derivation rule 102b. In this embodiment, the one-time-password derivation rule 102b is applied to a presentation pattern 191 created by arranging sixty four pattern elements each selected from one-digit numerals 0 to 9, in the given pattern format 191p comprised of four 4-by-4 matrixes. In FIG. 7, respective positions of the pattern elements in the given pattern format 191p are distinguishably presented by sixty four numerals 01 to 64. When the presentation pattern 191 is presented to a user requesting authentication (hereinafter referred to simply as "requesting user"), one of the one-digit numerals 0 to 9 will be presented at a respective one of the positions of the pattern elements in the given pattern format 191p.

Preferably, the one-time password 192 to be entered comprises a variable numeral to be entered based on the presentation pattern 191, and a fixed numeral to be entered without being based on the presentation pattern 191. The number of pattern elements comprised in the presentation pattern 191 is sixty four. Thus, selected ones of the positions of the sixty four pattern elements comprised in the presentation pattern 191 are represented by corresponding ones of two-digit numerals 01 to 64 assigned to the respective positions. Further, the fixed numeral to be entered without being based on the presentation pattern 191 is represented by a two-digit numeral which consists of "9" to be assigned to a tens digit thereof to denote that the entered numeral is a fixed numeral, and one of one-digit numerals 0 to 9 to be assigned to a unit digit thereof. As illustrated in FIG. 7, initial four numerals of the one-time password 192 are entered by selecting four of the pattern elements of the presentation pattern 191 at specific positions. As a part of the one-time-password derivation rule 102b corresponding to the initial four numerals of the one-time password 192, "01", "16", "29", "20" which are numerals indicative of respective positions of the four pattern elements, are arranged in this order. The selected pattern elements are entered using a keyboard 196 or the like. Subsequent two numerals of the one-time password 192 are entered using the keyboard 196 or the like without being based on the presentation pattern 191. As a part of the one-time-password derivation rule 102b corresponding to the two numerals of the one-time password 192, "92" and "99" are subsequently arranged in this order, wherein the numeral "2" or "9" to be entered as a part of the one-time password 192 is added to the numeral "9" denoting a direct input. Subsequent last one numeral of the one-time password 192 is entered by selecting one of the pattern elements of the presentation pattern 191 at a specific position. As a part of the one-time-password derivation rule 102b corresponding to the last one numeral of the one-time password 192, "33" which is a numeral indicative of the position of the lastly selected pattern element, is subsequently arranged, and the one-time-password derivation rule 102b is terminated in the numeral "33". The one-time-password derivation rule 102b may be configured such that an end mark uniquely defining a termination point thereof, such as a numeral "00", is added to a tail end thereof, or a numerical value indicating the entire length thereof is associated therewith.

(Pattern Seed Value)

The pattern seed value 183 is adapted to be transformed according to a given transformation rule so as to uniquely specify a plurality of pattern elements to be comprised in a single presentation pattern 191. The pattern seed value 183 itself is generated in a given range according to a given generation rule. In the present invention, the pattern seed value 183 has a key feature in that it is combined with additional information as a second factor, before being subjected to a given transformation rule to create a plurality of pattern elements to be comprised in a single presentation pattern 191, as described in detail later. In order to display a presentation pattern 191, the off-line two-factor authentication client 151 is required to store therein information for creating the presentation pattern 191. However, if the off-line two-factor authentication client 151 is configured to store a pattern element sequence 190 for forming the presentation pattern 191 in its raw or untransformed form, the pattern element sequence 190 is likely to be figured out by a malicious third party through analysis of the off-line two-factor authentication client 151, and thereby the presentation pattern 191 is likely to be figured out. This is undesirable in terms of security. As measures against this risk, it is contemplated to avoid storing the pattern element sequence 190. However, the off-line two-factor authentication client 151 can perform authentication only if the presentation pattern 191 is created and displayed.

The pattern seed value 183 is intended to solve the above contradictory requirements, and adapted to uniquely specify a presentation pattern 191 only after being subjected to the given transformation rule, i.e., it is information which is not identical to a pattern element sequence 190. In the off-line two-factor authentication client 151, a pattern element sequence 190 itself is not stored, but a pattern seed value 183 is stored instead. Then, the off-line two-factor authentication client 151 is operable to subject the stored pattern seed value 183 to a given transformation rule to create the presentation pattern 191. For example, it is contemplated to use a hash function algorithm as the given transformation rule. As above, the pattern seed value 183 is used to prevent storage of a pattern element sequence 190 itself, so that security is enhanced.

In the present invention, in advance of creating a plurality of pattern elements to be comprised in a single presentation pattern 191, the pattern seed value 183 is combined with additional information as a second factor, in accordance with a given transformation rule. As the second factor, a client ID 102*c* of the off-line two-factor authentication client 151 to be acquired when used by the requesting user is used. In this case, a fact of possessing a device capable of outputting a client ID 102*c* serves as an additional condition for verification during authentication, so that security is enhanced. More specifically, the pattern seed value 183 is adapted to uniquely specify a plurality of pattern elements to be comprised in a single presentation pattern 191, in combination with the client ID 102*c*. As a result, the presentation pattern 191 is created while incorporating not only information about the pattern seed value 183 but also the client ID 102*c*, so that it becomes possible to verify whether a one-time password 192 is entered based on a presentation pattern 191 created using a proper client ID 102*c*. In the present invention, information about the client ID 102*c* is incorporated in a presentation pattern 191 by scrambling the presentation pattern 191 using the client ID 102*c* of the off-line two-factor authentication client 151. A one-time password 192 is obtained as a result of applying a one-time-password derivation rule 102*b* of the requesting user, to the presentation pattern 191 created in the above manner. As above, in the present invention, a one-time password 192 includes information which determines the success or failure of authentication based on two factors: a first factor of whether the one-time password 192 is entered based on a proper one-time-password derivation rule 102*b*, i.e., by a proper user; and a second factor of whether the one-time password 192 is entered from an off-line two-factor authentication client 151 having a proper client ID 102*c*, i.e., possessed by the proper user. This makes it possible to perform two-factor authentication, which provides drastically enhanced security.

The present invention has a key feature in that, despite the authentication using a client ID 102*c* as the second factor, the client ID 102*c* itself is not verified during user authentication. This means that, even if the verification code for authentication is leaked, it does not lead to leakage of the client ID. More specifically, even if the verification code for authentication is leaked, it is impossible to infer a presentation pattern and a one-time-password derivation rule, so that it becomes possible to eliminate a risk of inference of a proper one-time password to obtain strong security. As above, the client ID 102*c* as the second factor can be added as a second authentication factor, without causing a risk of leakage of the client ID 102*c*.

Further, in the operation of creating a presentation pattern 191, a plurality of types of client IDs (client ID group) 102*c* may be used together. In this case, a pattern seed value 183 will specify a plurality of pattern elements to be comprised in a presentation pattern 191, in combination with the plurality of types of client IDs 102*c*. As long as the plurality of types of client IDs 102*c* originate from different sources, respectively, even though they are associated with a common off-line two-factor authentication client 151, the number of authentication factors can be substantially increased up to three or more so as to obtain stronger security.

It is also effective that, in the operation of creating a presentation pattern 191, other information is additionally used to further scramble the presentation pattern 191. For example, as such other information, it is possible to use a user ID 102*a*. In this case, a pattern seed value 183 will uniquely specify a plurality of pattern elements to be comprised in a single presentation pattern 191, in combination with the user ID 102*a* and the client ID 102*c*. The user ID 102*a* is information originating from a user, and thereby it cannot be said that such a processing contributes to an increase in the number of authentication factors. However, a calculation using the user ID 102*a* is additionally required to create a presentation pattern 191 from a pattern seed value 183, so that it becomes more difficult to infer the presentation pattern 191 from a one-time password 192. Therefore, security can be further enhanced by additionally using the user ID 102*a* to create a presentation pattern 191.

Typically, a pattern seed value 183 is a numerical value generated in accordance with a random-number generation algorithm to fall within a given range. Instead of the random-number generation algorithm, the pattern seed value 183 may be generated in accordance with any other suitable rule for generating a numerical value within the given range, such as a count-up or count-down operation for sequentially adding or subtracting a given value to or from a given initial value.

(One-Time Password)

A one-time password 192 is a single-use password to be created/entered by the requesting user, through an operation of applying a one-time-password derivation rule 102*b* of the requesting user to a presentation pattern 191. FIG. 8 is a conceptual diagram illustrating a process of entering a one-time password in the matrix authentication scheme. The requesting user sequentially extracts certain numerals presented at given positions on a matrix while applying the one-time-password derivation rule 102*b* to the presentation pattern 191, to create a one-time password 192, and enters the one-time password 192 into the off-line two-factor authentication client 151. The one-time password 192 may be entered, including a fixed numeral without being based on the presentation pattern 191. In other words, a fixed password may be included in the one-time password. The arrowed lines and circles each indicated by the dashed line in FIG. 13 denote that a one-time password based on the presentation pattern 191 is entered from a keyboard 196. As illustrated in FIG. 8, "2504" is entered based on the presentation pattern 191. Subsequently, "29" is entered as fixed numerals without being based on the presentation pattern 191, and then "0" is entered based on the presentation pattern 191. As a result, "2504290" is entered as a one-time password 192.

(Verification Code)

A verification code 193 is data for verifying propriety of an entered one-time password 192. A plurality of verification codes 191 are created by applying a one-time-password derivation rule 102*b* of a requesting user to respective sets of pattern elements (certain pattern elements at specific positions) included in a plurality of presentation patterns 191 created based on the plurality of pattern seed values 183 stored in the off-line two-factor authentication client 151, and subjecting respective obtained results to a one-way function algorithm, i.e., hashing the respective obtained results, so as to prevent inverse operation. In other words, each of the verification codes 193 is created by subjecting, to a one-way function algorithm, a value identical to that of a proper one-time password 192 created as a result of applying a proper one-time-password derivation rule 102*b* associated with a requesting user to a proper presentation pattern 191. Thus, the verification codes 193 are created in the same number as that of creatable or displayable presentation patterns 191, and pre-stored in the off-line two-factor authentication client 151. During user authentication in the off-line two-factor authentication client 151, a value obtained by subjecting an entered one-time password 192 to the same one-way function algorithm as that used for creating the verification codes 193 is compared with one of the verification codes 191 corresponding to a presented presentation pattern 191 to verify propriety of the entered one-time password 192. It is understood that, even if the verification code is not hashed, propriety of the entered one-time password 192 can be verified. In this case, the non-hashed verification code is identical to a proper one-time password 192. This causes a problem that, if such a verification code is leaked together with a client ID through analysis of the client PC by a malicious third party, a plurality of pairs of a presentation pattern 191 and a proper one-time password 192 are likely to be known, and a one-time-password derivation rule 102*b* as a password is likely to be figured out. In contrast, the hashed verification code 193 makes it impossible to figure out the proper one-time password 192 based thereon. Thus, even if the client PC is analyzed by a malicious third party, the one-time-password derivation rule 102*b* as a password will never be leaked.

(One-Way Function and Hash Function)

The term "one-way function" means a function providing the following relation: although an output value corresponding to a certain input value can be easily calculated, the original input value is hardly calculated from the output value. The term "hash function" means a function having a one-way encryption property as a basic feature of a one-way function, and a collision resistance, i.e., a feature that, if an original input value varies, a probability that output values become identical to each other is extremely low. Generally, the hash function creates output values in a constant range, regardless of an input value. The term "one-way function" is a concept including the hash function, and the one-way function and the hash function can be used in approximately the same manner. In cases where a high collision resistance is required due to a relatively wide range of input value, it is desirable to use the hash function. In the present invention, although it is apparent that the hash function can be used in place of the one-way function, the one-way function may be used in place of the hash function.

[User Authentication Process of the Present Invention]

With reference to the drawings, the two-factor user authentication system 100 according to one embodiment of the present invention will be described. FIG. 1 is a block diagram illustrating a hardware configuration thereof, and FIG. 2 is a block diagram illustrating a functional configuration thereof. FIGS. 3 and 4 are flowcharts illustrating an operation thereof. Firstly, an outline of a user authentication process of the present invention will be described below. The user authentication process according to this embodiment is based on the aforementioned matrix authentication scheme which is one type of challenge/response authentication schemes. In the user authentication process of the present invention, a one-time-password derivation rule 102*b* is used as a password of a user subject to authentication, in such a manner that a plurality of pattern elements are arranged in a given pattern format and presented as a presentation pattern 191 to the user in an off-line two-factor authentication client 151, and the one-time-password derivation rule 102*b* is applied to certain ones of the pattern elements included in the presentation pattern 191 at specific positions, so as to create a one-time password 192, in any embodiment of the present invention.

An off-line authentication support server 101 operates to pre-generate a plurality of pattern seed values 183 which is information necessary for the off-line two-factor authentication client 151 to create the presentation pattern 191 to be presented to the user in the off-line two-factor authentication client 151, and transmit the pattern seed values 183 to the off-line two-factor authentication client 151 so as to allow them to be pre-stored in the off-line two-factor authentication client 151. The off-line two-factor authentication client 151 operates to acquire a client ID 102*c*. The presentation pattern 191 is created based on one of the stored pattern seed values 183 and the acquired client ID 102*c*. A plurality of verification codes 193 each used for verifying whether a one-time password 192 entered into the off-line two-factor authentication client 151 is proper, are pre-created in the off-line authentication support server 101 by applying a one-time-password derivation rule 102*b* as a password of the user to respective presentation patterns 191 formed from a plurality of pattern element sequences 190 based on the respective pattern seed values 183 and the acquired client ID and subjecting respective obtained results to a one-way function algorithm. Then, the created verification codes 193 are transmitted to the off-line two-factor authentication client 151 via a network or a recording medium, and stored in the off-line two-factor authentication client 151.

The off-line two-factor authentication client 151 operates to select one of a plurality of creatable presentation patterns 191, and display the selected presentation pattern 191. The user applies his/her one-time-password derivation rule 102*b* to the displayed presentation pattern 191 to create a one-time password 192, and enters the one-time password 192. The off-line two-factor authentication client 151 operates to compare a result of subjecting the entered one-time password 192 to the same one-way function algorithm as that used for creating the verification codes 193, with a corresponding one of the verification codes 193, wherein, if they are identical to one another, it determines that the user is successfully authenticated, and operates to start a given operation in the event of successful authentication.

[Hardware Configuration of Off-Line Two-Factor User Authentication System 100]

A configuration of the off-line two-factor user authentication system 100 will be described below. Referring to FIG. 1, the off-line two-factor user authentication system 100 generally comprises the off-line authentication support server 101 and the plurality of clients each serving as the off-line two-factor authentication client 151. The off-line authentication support server 101 includes a CPU 101a, a RAM 101b, a storage device 101c, a user interface (user I/F) 101d, and an external/network interface (external/network I/F) 101e, which are connected to each other via a bus. The storage device 101c has a storage area which stores an OS 101c1 and a user-authentication support application 101c2 and includes a password storage section 102 in a storage area thereof. The password storage section 102 stores user IDs 102a, one-time-password derivation rules 102b and client IDs 102c, in associated relation with each other on a user-by-user basis. The off-line two-factor authentication client 151 includes a CPU 151a, a RAM 151b, a storage device 151c, a user interface (user I/F) 151d, and an external/network interface (external/network I/F) 151e, which are connected to each other via a bus. The storage device 151c stores an OS 151c1 in the storage area thereof, and includes a verification data storage section 261 in the storage area thereof. The OS 151c1 includes a verification-data request module 151c2, a seed-value selection/pattern creation module 151c3, a verification-code determination/authentication module 151c4, and a client-ID acquisition module 151c5. The verification-data request module 151c2 stores a plurality of pattern seed values 183 and a plurality of verification codes 193. The plurality of pattern seed values 183 and the plurality of verification codes 193 will hereinafter be referred to collectively as "verification data 194".

The off-line authentication support server 101 is a component for pre-creating necessary data for allowing the off-line two-factor authentication client 151 to perform off-line two-factor user authentication. For example, the off-line authentication support server 101 is configured as a server computer having the OS 101c1 and the user-authentication support application 101c2 installed thereon. The CPU 101a is a processor operable to execute the user-authentication support application 101c2, etc., on the OS 101c1 so as to perform information processing for supporting user authentication in the off-line two-factor authentication client. The RAM 101b is a memory for providing a memory space allowing software stored on the storage device 101c to be read thereon and a work area required when the read software is executed by the CPU 101a. The storage device 101c is adapted to store/manage information, such as software and data, and typically configured as a hard disk drive. Preferably, the storage device 101c stores a file of programs of the OS 101c1 and the user-authentication support application 101c2, and these programs will be read on the RAM 101b and executed. As for the programs of the OS 101c1 and the user-authentication support application 101c2, the storage device 101c may be configured as a ROM storing them thereon. In this case, the ROM serves as a firmware in cooperation with a program execution element, such as the CPU 101a. The user I/F 101d is operable to allow data to be input/output from/to a user therethrough, and typically comprised of: key input device, such as a keyboard 196 or a software keyboard; output device, such as a display, for displaying information on a screen; and a hardware I/F between the key input device and the output device. As the keyboard 196, it is possible to use any suitable type capable of entering therethrough a plurality of pattern elements for forming a one-time password, such as a numeric keypad or a standard full keyboard. The software keyboard is designed to accept key input in such a manner as to display symbols of a keyboard on a display screen, and allow a user to select the symbol corresponding to a desired key, using a pointing device, such as a touch panel, a mouse or a track ball. The external/network I/F 101e is adapted to be connected to a storage device, such as a USB memory or a Floppy® disk drive, or a network so as to allow information to be input/output from/to the storage device or the network.

The OS 101c1 and the user-authentication support application 101c2 may be combined together in the form of an integrated program. For example, the OS 101c1 may include the functions of the user-authentication support application 101c2. Further, the user-authentication support application 101c2 may be incorporated in another application. Each of the OS and the application may be divided into a plurality of programs.

The off-line authentication support server 101 may be connected to or may not be connected to the off-line two-factor authentication client 151 via a network, as long as it can transmit the verification data 194 to the off-line two-factor authentication client 151 in some way. Preferably, the off-line authentication support server 101 is configured to be connectable to the off-line two-factor authentication client 151 via a network, wherein it pre-transmits the verification data 194 to the off-line two-factor authentication client 151 in the online state. Preferably, the network is the Internet or an intranet operable in accordance with a TCP/IP-based protocol. When the off-line two-factor authentication client 151 in an intranet operates based on a client Windows® OS, the network may be a Windows® domain network operable in accordance with a TCP/IP-based protocol. Although the OS in this specification is described by taking a Windows® OS as an example, any other suitable OS, such as Mac OS®, Linux® or Unix®, may also be used.

In cases where the off-line authentication support server 101 is connected to the off-line two-factor authentication client 151 via a network, the off-line authentication support server 101 is typically disposed on the network, such as the Internet or an intranet, to serve as a Web server for providing verification data 194 for user authentication, to the off-line two-factor authentication client 151 accessing via the network. In this case, it is preferable to transmit the verification data 194 to the off-line two-factor authentication client 151 during a network logon authentication for connecting the off-line two-factor authentication client 151 to a common network with the off-line authentication support server 101.

Preferably, in response to logon of the off-line two-factor authentication client 151, a program for executing the user authentication process of the present invention is activated to display a logon authentication screen configured to allow a user to select one of logon to a network and logon to a computer. In this case, respective logon authentications in the online and off-line states can be performed in a seamless manner. Further, during a network logon authentication for the off-line two-factor authentication client 151, a request for creation and transmission of the verification data 194 can be transmitted to the off-line authentication support server 101 using a HTTP protocol, a HTTPS protocol or the like. Thus, just after success of the network logon authentication, the off-line two-factor authentication client 151 can acquire the verification data 194 from the off-line authentication support server 101 via a network in a convenient and reliable manner.

The off-line authentication support server 101 may also be configured as a mail server for transmitting an electric mail including the verification data 194 as an attachment to a user. In this case, the off-line two-factor authentication client 151 is configured to access a server reserving electric mails transmitted from the off-line authentication support server 101 to the user, to receive the eclectic mail and acquirer the verification data 194 attached to the electric mail. The data attached to the electric mail may be the verification data 194 itself or may be a file in an executable format for installing the verification data 194. Preferably, the off-line authentication support server 101 stores respective mail addresses of users of the system. The electric mail-based transmission of the verification data 194 is effective in a situation where the data transmission from the off-line authentication support server 101 via a network or a recording medium is difficult due to an extended business trip of a user.

In cases where the off-line authentication support server 101 is not connected to the off-line two-factor authentication client 151 via a network, the off-line authentication support server 101 may be configured to output the verification data 194 to a recording medium, such as a Floppy® disk or a USB memory, through the external/network I/F 101e. In this case, the output data may be the verification data 194 itself or may be a file in an executable format for installing the verification data 194. The recording medium storing the verification data 194 is connected to the off-line two-factor authentication client 151 through the external/network I/F 101e, to allow the off-line two-factor authentication client 151 to acquire the verification data 194 therefrom.

The above process of causing the off-line authentication support server 101 to create the verification data 194 and causing the off-line two-factor authentication client 151 to acquire/store the verification data 194 has to be preliminarily performed before a user starts requesting authentication in the off-line two-factor authentication client 151.

The OS 101c1 is an operating system closely related to hardware of the off-line authentication support server 101 and operable to perform fundamental information processing. The user-authentication support application 101c2 is an application software which operates on the OS 101c1 to create a plurality of pattern seed values 183 and a plurality of verification codes 194 and transmit them to the off-line two-factor authentication client 151. In the off-line authentication support server 101 configured as a Web server, the user-authentication support application 101c2 is typically a Web server program which has a servlet-type authentication program or an authentication program to be called through a CGI, and is operable to provide the verification data 194 through the Web of the Internet or an intranet. In the off-line authentication support server 101 configured as a mail server, the user-authentication support application 101c2 is typically a mail server program which includes a program for creating the verification data 194 and is operable to provide an electric mail attached with the verification data 194 via the Internet or an intranet. The password storage section 102 is typically a part of a storage area of a hard disk drive or the like, and data is preferably stored on the password storage section 102 in the form of an encrypted file. The user ID 102a is data for uniquely identifying each user. Any type of character sequence may be used as the user ID 102a. As mentioned above, the one-time-password derivation rule 102b is a rule to be applied to certain pattern elements included in a presentation pattern at specific positions so as to create a one-time password, and is data serving as a password of a user. The client ID 102c is data for identifying the authentication client 151 when used by a requesting user, and is data to be used in an operation of creating a presentation pattern, in combination with a pattern seed value.

In the off-line two-factor user authentication system 100, the off-line two-factor authentication client 151 is a component for performing authentication in the off-line state in response to an authentication request from a user. The off-line two-factor authentication client 151 is a terminal having the OS 151c1, the verification-data request module 151c2, the seed-value selection/pattern creation module 151c3, the verification-code determination/authentication module 151c4 and the client ID acquisition module 151c5, which are installed thereon. Specifically, the off-line two-factor authentication client 151 is configured as a PC, a portable phone or a personal digital assistant (PDA). The CPU 151a is a processor operable to execute the verification-data request module 151c2, the seed-value selection/pattern creation module 151c3, the verification-code determination/authentication module 151c4 and the client ID acquisition module 151c5 together with the OS 151c1 so as to perform information processing for user authentication. The RAM 151b is a memory for providing a memory space allowing software stored on the storage device 151c to be read thereon, and a work area required when the read software is executed by the CPU 151a. The storage device 151c is adapted to store/manage information, such as software and data, and typically configured as a hard disk drive. Preferably, the storage device 151c stores a file of programs of the OS 151c1, the verification-data request module 151c2, the seed-value selection/pattern creation module 151c3, the verification-code determination/authentication module 151c4 and the client ID acquisition module 151c5, and these programs will be read on the RAM 151b and executed. As for the OS 151c1, the verification-data request module 151c2, the seed-value selection/pattern creation module 151c3, the verification-code determination/authentication module 151c4 and the client ID acquisition module 151c5, the storage device 101c may be configured as a ROM storing the programs thereon. In this case, the ROM serves as a firmware in cooperation with a program execution element, such as the CPU 151a. The user I/F 151d is operable to allow data to be input/output from/to a user therethrough. Although not illustrated, the user I/F 151d is typically comprised of: key input device, such as a keyboard 196 or a software keyboard; output device, such as a display, for displaying information on a screen; and a hardware I/F between the key input device and the output device. The external/network I/F 151e is adapted to be connected to a storage device, such as a USB memory or a Floppy® disk drive, an external device equipped with an external communication interface, or a network, so as to allow information to be input/output therefrom/thereto. The off-line two-factor authentication client 151 can acquire the client ID thereof from the external communication interface-equipped external device through the external/network I/F 151e. Further, the off-line two-factor authentication client 151 can be connected to the off-line authentication support server 101 through the external/network I/F 151e and via a network. As the external communication interface, it is possible to use various communication interface, such as a USB, or a non-contact communication interface including BlueTooth®, wireless LAN, infrared communication interface, Felica® and RFID. As the external device to be connected to the off-line two-factor authentication client 151, it is possible to use a USB memory, a wireless-communication data card (USB connection, PCcard connection, Express Card connection, etc.), an IC card such as Felica® and RFID, a portable phone, a biological-authentication-information (fingerprint, iris, vein or the like) reader, etc. In the case where the off-line two-factor authentication client 151 is not connected to the off-line authentication support server 101 via a network, the verification-data request module 151c2 is not essential.

The off-line two-factor authentication client 151 is connected to a client-ID storage section 172 which stores its own client ID 102c to be acquired when used by the requesting user. In the present invention, as long as the off-line two-factor authentication client 151 is capable of acquiring its own client ID 102c, it is not necessary to have the client-ID storage section 172. Although the client-ID storage section 172 may be located within a housing of the off-line two-factor authentication client 151, it is only enough for the off-line two-factor authentication client 151 to be capable of acquiring its own client ID 102c in some way. Thus, such a client-ID storage section 172 is not included as an essential element in the concept of the present invention.

As the client ID 102c to be acquired when the off-line two-factor authentication client 151 is used by the requesting user, it is possible to use information incorporated in a hardware of the off-line two-factor authentication client 151 (hardware-related information), information associated with software of the off-line two-factor authentication client 151 (software-related information), information acquired from the external device connected to the off-line two-factor authentication client 151 (external device-related information), biological information about the requesting user acquired from a biological-authentication-information reader incorporated in or connected to the off-line two-factor authentication client 151 (biological authentication information), etc.

As for the hardware-related information, it is possible to use, as the client ID 102c, a serial number of a hardware component such as a CPU, a MAC (Media Access Control) address of a network interface card, a serial number of a hard disk or the like. In this case, the client-ID storage section 172 is configured as a storage area for the serial number of the hardware component such as a CPU, a storage area for the MAC address of the network interface card, a storage area for the serial number of the hard disk or the like. The hardware-related information may be acquired from a hardware storing it, via the bus, in such a manner that the hardware is subjected to an appropriate read operation.

As for the software-related information, it is possible to use, as the client ID 102c, a GUID (Globally Unique Identifier) or a product ID or a product key of a Windows® OS, an IP address of a TCP/IP network or the like. In this case, the client-ID storage section 172 is configured as a file on a hard disk (or a storage area on a memory) storing information about the GUID (Globally Unique Identifier) of the Windows® OS, a file on a hard disk (or a storage area on a memory) storing information about the product ID and the product key of the Windows® OS, a file on a hard disk (or a storage area on a memory) storing setting information about the IP address of the TCP/IP network or the like. The software-related information may be acquired from the file on the hard disk (or the storage area on the memory) storing it, using a command of the OS.

As for the external device-related information, it is possible to use, as the client ID 102c, a serial number of a USB memory, a serial number or a contractor ID or a phone number of a wireless communication data card or a portable phone, a serial number of a BlueTooth® or wireless LAN-equipped device, an ID number (serial number) of an IC card such as Felica® or RFID, or the like. In this case, the client-ID storage section 172 is configured as a storage area for the serial number of the USB memory, a storage area for the serial number or contractor ID or phone number of the wireless communication data card or the portable phone, a storage area for the serial number of the BlueTooth® or wireless LAN-equipped device, a storage area for the ID number (serial number) of the IC card such as Felica® or RFID, or the like. The external device-related information may be acquired from the external device storing it, through the external/network I/F 151e, by transmitting an appropriate read command to the external device.

As for the biological authentication information, it is possible to use, as the client ID 102c, biological authentication information which outputs by reading a given biological pattern suitable for verification of identity, such as fingerprint, iris or vein, using a biological-authentication-information reader. In this case, the client-ID storage section 172 is configured as an information processing means in the biological-authentication-information reader during the operation of reading a given biological pattern of the requesting user to output biological authentication information. This means that transforming a given fixed biological pattern of the requesting user to biological authentication information is equivalent to reading the client ID 102c from the client-ID storage section 172. The biological authentication information may be acquired from the biological-authentication-information reader reading a given biological pattern of the requesting user via the bus (in cases where the biological-authentication-information reader is incorporated in the off-line two-factor authentication client) or the external/network I/F 151e (the biological-authentication-information reader is provided outside the off-line two-factor authentication client), by transmitting an appropriate read command to the biological-authentication-information reader.

The OS 151c1, the verification-data request module 151c2, the seed-value selection/pattern creation module 151c3, the verification-code determination/authentication module 151c4 and the client ID acquisition module 151c5 may be partially or entirely combined together in the form of an integrated program. For example, the verification-data request module 151c2, the seed-value selection/pattern creation module 151c3, the verification-code determination/authentication module 151c4 and the client ID acquisition module 151c5 may be integrated together. Alternatively, they may be independent applications or may be incorporated another application. Further, each of them may be divided into a plurality of programs.

The OS 151c1 is an operating system closely related to hardware of the off-line two-factor authentication client 151 and adapted to perform fundamental information processing and serve as a fundamental program depending on the hardware of the off-line two-factor authentication client 151. The OS 151c1 may be configured as a firmware having an architecture similar to a platform. The verification-data request module 151c2 is a program for issuing a request for creating and transmitting the verification data 194 to the off-line authentication support server 101, in response to logon of the off-line two-factor authentication client 151 to a common network with the off-line authentication support server 101. Typically, the verification-data request module 151c2 is configured as a module adapted to be called by the OS 151c1 during network logon authentication. The seed-value selection/pattern creation module 151c3 is a program running together with the OS 151c1 to select one of a plurality of pattern seed values 183 included in the verification data 194 in accordance with a given selection rule to create a pattern element sequence 190, and further create a presentation pattern 191 based on the pattern element sequence 190. Typically, the seed-value selection/pattern creation module 151c3 is configured as a module adapted to be called by the OS 151c1 during computer logon authentication. The created presentation pattern 191 is displayed on a screen according to the OS 151c1. The verification-code determination/authentication module 151c4 is a program operating together with the OS 151c1 to determine one corresponding to the displayed presentation pattern 191 from a plurality of verification codes 291 included in the verification data 294, and compare a one-time password 292 entered by the requesting user through the OS 151c1, with the determined verification code 291, wherein, if they are identical to one another, it successfully authenticates the user. Typically, the verification-code determination/authentication module 151c4 is configured as a module adapted to be called by the OS 151c1 during the computer logon authentication. Each of the verification-data request module 151c2, the seed-value selection/pattern creation module 151c3, the verification-code determination/authentication module 151c4 and the client ID acquisition module 151c5 may be configured as a firmware having an architecture similar to a platform. The client ID acquisition module 151c5 is a program for acquiring the client ID 102c from the off-line two-factor authentication client when used by the requesting user. Typically, the client ID acquisition module 151c5 is configured as a module adapted to be called by the OS 151c1 during computer logon authentication.

Typically, the OS 151c1 is a client Windows® OS. The verification-data request module 151c2 is operable to request the verification data in the online state, for example, during network logon authentication. Then, the seed-value selection/pattern creation module 151c3, the verification-code determination/authentication module 151c4 and the client ID acquisition module 151c5 are operable to display a presentation pattern 191 on a computer logon authentication screen to prompt a user to follow an authentication procedure, and perform user authentication based on the authentication process of the present invention. In place of standard Windows® logon authentication, the user authentication based on the authentication process of the present invention can be desirably performed in the above manner.

A standard Windows® logon authentication screen is specifically modified as follows. The following description will be made by taking Windows® XP as an example. Firstly, a logon authentication module which is a program for performing the functions of the verification-data request module 151c2, the seed-value selection/pattern creation module 151c3, the verification-code determination/authentication module 151c4 and the client ID acquisition module 151c5, is created as a Windows® DDL file. In this example, a DDL file having a name "SmxGina.dll" is created. Further, a program for a Windows® logon authentication screen is designated as data having a key with a name "GinaDLL" in the following registry location:

HKEY_LOCAL_MACHINE¥SOFTWARE¥Microsoft¥ WindowsNT¥CurrentVers ion¥Winlogon

A standard logon authentication module is a DLL file "msgina.dll", and this DLL file is configured as the above data having the key with the name "GinaDLL". When the data having this key is rewritten as "SmxGina.dll", a logon authentication module "SmxGinaDLL" implementing the authentication process of the present invention will be called during authentication such as logon authentication.

FIG. 9 is a schematic diagram illustrating images on logon authentication screens 197A, 197B in the two-factor user authentication system 100. When the logon authentication module "SmxGinaDLL" is activated during logon of Windows®, the logon authentication screen 197A is firstly displayed. A user-name input field and a logon-target input field are displayed on the logon authentication screen 197A. Under a condition that the off-line two-factor authentication client 151 is connected to a domain network, a user can enter a domain name into the logon-target input field to initiate a Windows®-domain-network logon authentication procedure for authorizing to use the network online. Under a condition that the off-line two-factor authentication client 151 is not connected to a domain network, the user can enter a domain name into the logon-target input field to initiate a logon authentication procedure for authorizing to use the computer off-line as a domain network user. Further, a computer name can be entered into the logon-target input field to initiate a computer logon authentication procedure for authorizing to use the computer off-line as a local computer user. When the user enters his/her user ID as a requesting-user ID 181 into the user-name input field, the logon authentication screen 197B including the presentation pattern 191 is displayed. The logon authentication screen 197B has a password input field. When characters, such as numerals, serving as a one-time password are entered into the password input field using the keyboard 196, marks "*" are displayed one-by-one in response to the input of the characters.

[Functional Configuration of Off-Line Two-Factor User Authentication System 100]

FIG. 2 is a block diagram illustrating a functional configuration of the off-line two-factor user authentication system 100 according to this embodiment. FIG. 2 is a diagram expressing the hardware configuration of the off-line two-factor user authentication system 100 illustrated in FIG. 1, from the aspect of information processing to be performed based on cooperation between software and hardware resources, wherein the information processing is illustrated on a functional block-by-functional block basis. In FIG. 2, the off-line authentication support server 101 comprises the password storage section 102, request receiving section 103, pattern-seed-value generation section 104, pattern-seed-value transmission section 105, verification-code creation section 106 and verification-code transmission section 111. These functional blocks are achieved appropriately in cooperation with hardware elements, such as the RAM 101b, the storage device 101c, the user I/F 101d and the external/network I/F 101e, under the condition that a required part of the user-authentication support application 101c2 and a required part of the OS 101c1 are read from the storage device 101c onto the RAM 101b, and executed by the CPU 101a.

The password storage section 102 is a functional block configured to pre-stores user IDs 102a, one-time-password derivation rules 102b as passwords, and client IDs, in associated relation with each other on a user-by-user basis. This functional block is achieved based on cooperation between software and hardware elements, such as the CPU 101a, the RAM 101b and the storage device 101c. The request receiving section 103 is a functional block operable to receive a verification-data request including a user ID of a requesting user (requesting-user ID 181), i.e., a request for creation and output of verification data 194 for the requesting user. This functional block is achieved based on cooperation between software and hardware elements, such as the CPU 101a, the RAM 101b, and the user I/F 101d or the external/network I/F 101e. The verification-data request may be received from the off-line two-factor authentication client 151 via a network, or may be entered directly into the off-line authentication support server 101 through the user I/F 101d. The pattern-seed-value generation section 104 is a functional block operable, in accordance with a given generation rule, to generate a plurality of pattern seed values 183 each adapted to define a presentation pattern in combination with a client ID 102c. This functional block is achieved based on cooperation between software and hardware elements, such as the CPU 101a and the RAM 101b. The pattern-seed-value transmission section 105 is a functional block operable to output the plurality of generated pattern seed values 183 to the off-line two-factor authentication client 151 so as to allow them to be stored in the off-line two-factor authentication client 151. This functional block is achieved based on cooperation between software and hardware elements, such as the CPU 101a, the RAM 101b, and the user I/F 101d or the external/network I/F 101e. The plurality of pattern seed values 183 may be transmitted to the off-line two-factor authentication client 151 via a network or may be output to a recording medium. The verification-code creation section 106 is a functional block operable to apply the pre-stored one-time-password derivation rule 102c associated with the requesting-user ID 181 received through the request receiving section 103 to respective sets of pattern elements comprised in a plurality of presentation patterns 191 formed from a plurality of pattern element sequences 190 created based on the generated pattern seed values and the pre-stored client ID associated with the received requesting-user ID 181 and in accordance with a given pattern-element-sequence creation rule, and subject respective obtained results to a one-way function algorism to create a plurality of verification codes. This functional block is achieved based on cooperation between software and hardware elements, such as the CPU 101a and the RAM 101b. The verification-code transmission section 111 is a functional block operable to output the plurality of generated verification codes 193 to the off-line two-factor authentication client 151 so as to allow them to be stored in the off-line two-factor authentication client 151. This functional block is achieved based on cooperation between software and hardware elements, such as the CPU 101a, the RAM 101b, and the user I/F 101d or the external/network I/F 101e. The plurality of verification codes 193 may be transmitted to the off-line two-factor authentication client 151 via a network or may be output to a recording medium.

The off-line two-factor authentication client 151 comprises user-ID input section 152, verification-data request section 153, pattern-seed-value receiving section 154, pattern-element-sequence creation section 155, pattern display section 156, one-time-password input section 157, verification-data storage section 161, verification-code receiving section 162, pattern-seed-value selection section 163, verification-code determination section 164, user authentication section 165 and client-ID acquisition section 171. These functional blocks are achieved appropriately in cooperation with hardware elements, such as the RAM 151b, the storage device 151c, the user I/F 151d and the external/network I/F 151e, under the condition that the verification-data request module 151c2, the seed-value selection/pattern creation module 151c3, the verification-code determination/authentication module 151c4, the client ID acquisition module 151c5 and a required part of the OS 151c1 are read from the storage device 151c onto the RAM 151b, and executed by the CPU 151a. In the case where the off-line two-factor authentication client 151 does not acquire the verification data 194 from the off-line authentication support server 101 via a network, the verification-data request section 153 is not essential.

The user-ID input section 152 is a functional block operable to allow a requesting user to enter his/her user ID as a requesting-user ID 181 therethrough. This functional block is achieved based on cooperation between software and hardware elements, such as the CPU 151a, the RAM 151b and the user I/F 151d. In the network logon authentication for authorizing a user to use the off-line two-factor authentication client 151 in the online state, the requesting-user ID is sent to the verification-data request section 153, and transmitted together with a verification-data request. The verification-data request section 153 is a functional block operable to transmit the verification-data request including information about the entered requesting-user ID 181 to the off-line authentication support server 101. This functional block is achieved based on cooperation between software and hardware elements, such as the CPU 151a, the RAM 151b and the external/network I/F 151e. The pattern-seed-value receiving section 154 is a functional block operable to acquire the plurality of pattern seed values 183 created in the off-line authentication support server 101 and comprised in the verification data 194. This functional block is achieved based on cooperation between software and hardware elements, such as the CPU 151a, the RAM 151b, and the user I/F 151d or the external/network I/F 151e. The plurality of pattern seed values 183 may be acquired from the off-line authentication support server 101 via a network or may be acquired from a recording medium storing them. The pattern-element-sequence creation section 155 is a functional block operable to create a pattern element sequence, i.e., a sequence of pattern elements to be comprised in a presentation pattern 191, based on the pattern seed value 183 selected by the pattern-seed-value selection section 163 in an aftermentioned manner and a client ID 102c acquired by the aftermentioned the client-ID acquisition section 171 in an aftermentioned manner and in accordance with a given creation rule. This functional block is achieved based on cooperation between software and hardware elements, such as the CPU 151a and the RAM 151b. The pattern display section 155 is a functional block operable to arrange the pattern elements of the pattern element sequence 190 created by the pattern-element-sequence creation section 155 in the given pattern format 191p to create a presentation pattern 191, and display the created presentation pattern 191 on the screen. This functional block is achieved based on cooperation between software and hardware elements, such as the CPU 151a, the RAM 151b and the user I/F 151d. The one-time-password input section 156 is a functional block operable to allow the requesting user to enter a one-time password 192 through the presentation pattern 191 displayed on the screen or the like. This functional block is achieved based on cooperation between software and hardware elements, such as the CPU 151a, the RAM 151b and the user I/F 151d. The verification-data storage section 161 is a functional block adapted to store verification data 194 consisting of a plurality of pattern seed values 193 and a plurality of verification codes 193 for a certain user, in associated relation with a user ID 102a of the user. This functional block is achieved based on cooperation between software and hardware elements, such as the CPU 151a, the RAM 151b and the storage device 151c. The verification data 194 stored in the verification-data storage section 161 is acquired from the pattern-seed-value receiving section 154 and the verification-code receiving section 162, and a user ID used at a timing of the acquisition of the verification data 194 is stored as a user ID 102a in association with the verification data 194. The verification-data storage section 161 is capable of storing verification data 194 for a plurality of users. The verification-code receiving section 162 is a functional block operable to acquire the plurality of verification codes 193 created in the off-line authentication support server 101 and comprised in the verification data 194. This functional block is achieved based on cooperation between software and hardware elements, such as the CPU 151*a*, the RAM 151*b*, the user OF 151*d* and the external/network OF 151*e*. The plurality of verification codes 193 may be acquired from the off-line authentication support server 101 via a network or may be acquired from a recording medium storing them. The pattern-seed-value selection section 163 is a functional block operable to check whether a user ID identical to the requesting-user ID 181 is stored as a user ID 102*a*, and, if there is a user ID identical to the requesting-user ID 181, to select one of the plurality of pattern seed values 183 included in the verification data 194 associated with the user ID, in accordance with a given rule so as to select a pattern seed value 183 for creating a presentation pattern 191. This functional block is achieved based on cooperation between software and hardware elements, such as the CPU 151*a*, the RAM 151*b* and the storage device 151*c*. The verification code determination section 164 is a functional block operable to determine one of the plurality of verification codes 193 which corresponds to the pattern seed value 183 selected by the pattern-seed-value selection section 163. This functional block is achieved based on cooperation between software and hardware elements, such as the CPU 151*a*, the RAM 151*b* and the storage device 151*c*. The user authentication section 165 is a functional block operable to compare a value obtained by subjecting the entered one-time password 191 to the same one-way function algorism as that used in creating the verification codes 193, with the determined verification code 193, and, if they are identical to one another, to determine that the user is successfully authenticated. This functional block is achieved based on cooperation between software and hardware elements, such as the CPU 151*a* and the RAM 151*b*. The client-ID acquisition section 171 is a functional block operable to acquire the client ID 102*c* of the off-line two-factor authentication client 151 when used by the requesting user. In cases where the client ID 102*c* is the hardware-related information or the software-related information, this functional block is achieved based on cooperation between software and hardware elements, such as the CPU 151*a* and the RAM 151*b*. In cases where the client ID 102*c* is the external device-related information, this functional block is achieved based on cooperation between software and hardware elements, such as the CPU 151*a*, the RAM 151*b* and the external/network OF 151*e*.

More specifically, the off-line two-factor user authentication system 100 according to this embodiment has the following configuration. The off-line authentication support server 101 has the same functions as those of a conventional online authentication server, and the off-line two-factor authentication client 151 carries out user authentication via a network, based on the functions. The off-line two-factor authentication client 151 operates based on the client Windows® OS. When a user logons to Windows®, the logon authentication module "SmxGinaDLL" is activated, and the logon authentication screen 197A is displayed. When a network logon authentication is requested by designating a domain name as a logon target using the logon authentication screen 197A, under the condition that the off-line two-factor authentication client 151 is connected to the domain network, the logon authentication screen 197B is additionally displayed, and the same user authentication process as that in a conventional online user authentication system is performed. If the network logon authentication is successfully completed, a verification-data request is transmitted from the off-line two-factor authentication client 151 to the off-line authentication support server 101. The off-line two-factor authentication client 151 acquires verification data 194 from the off-line authentication support server 101 online, and pre-stores the acquired verification data 194. When a computer logon authentication is requested by designating a domain or computer name as a logon target using the logon authentication screen 197A, under the condition that the off-line two-factor authentication client 151 is not connected to the domain network, the logon authentication screen 197B is additionally displayed, and the off-line authentication process of the present invention is performed based on the pre-stored verification data 194.

[Operation of Off-Line Two-Factor User Authentication System 100]

An operation of the off-line two-factor user authentication system 100 will be described below. The operation of the off-line two-factor user authentication system 100 is roughly divided into two stages. In the first stage, the off-line two-factor authentication client 151 causes the off-line authentication support server 101 to create verification data 294 for a requesting user, and acquires/stores the created verification data 194 in advance. In the second stage, the off-line two-factor authentication client 151 carries out authentication for the requesting user based on the pre-stored verification data 194 off-line.

(Operation I of Off-Line Two-Factor User Authentication System 100: Verification Data Acquisition]

The operational flow for acquiring verification data 194 will be described below. FIG. 3 is a flowchart illustrating the operation of acquiring verification data in the off-line two-factor user authentication system 100. A user subject to authentication based on the off-line two-factor user authentication system 100, enters and registers his/her user ID 102*a*, a one-time-password derivation rule 102*b* serving as a password of the user, and a client ID 102*c* of a client to be used by the user as the off-line two-factor authentication client 151 into/on the off-line authentication support server 101 in advance. In advance of user authentication, the password storage section 102 stores user IDs 102*a*, one-time-password derivation rules 202*b*, and client IDs 102, in associated relation with each other on a user-by-user basis (Step S101). Preferably, the off-line authentication support server 101 provides, for example, an initial registration Web page for registration of a user ID, a password and a client ID 102*c*, on the Web of the Internet or an intranet. Through the initial registration Web page, a user accesses the off-line authentication support server 101 from a terminal, such as the off-line two-factor authentication client 151. In response to the access, an input field for entering a user ID therethrough, and a first presentation pattern 191 having numerals 0 (zero) to 9 serving as pattern elements arranged in random order (not illustrated), are displayed on a screen of the off-line two-factor authentication client 151. The user enters a desired user ID 102*a* to be registered, into the input field. Then, the user selects certain ones of the pattern elements included in the first presentation pattern 191 at specific positions and enters one or more characters, such as fixed numerals, without being based on the first presentation pattern 191, in accordance with a selected one-time-password derivation rule 102*b* to be registered. The off-line authentication support server 101 stores the entered user ID 102*a* on the password storage section 102 as a user ID of the user. The selected one-time-password derivation rule 102*b* cannot be clarified only by the selected or entered numeric sequence. Thus, the off-line authentication support server 101 displays a second presentation pattern 191 different from the first presentation pattern to prompt the user to select or enter numerals again, in accordance with the selected one-time-password derivation rule 102*b*, and then compares this select or enter numeric sequence with the previous numeric sequence to ascertain the selected one-time-password derivation rule 102*b*. The second presentation pattern 191 can be generated to become largely different from the first present pattern 191. In this case, the selected one-time-password derivation rule 102b can be generally ascertained by presenting the presentation pattern 191 only twice. If the selected one-time-password derivation rule 102b cannot be ascertained by presenting the presentation pattern 191 twice, the presentation pattern 191 will be repeatedly presented while changing the content thereof until the selected one-time-password derivation rule 102b can be ascertained. In this manner, the selected one-time-password derivation rule 102b consisting of a combination of respective positions of certain ones to be selected from the pattern elements comprised in the presentation pattern 191, one or more fixed characters to be entered without being based on the presentation pattern 191, and a selection or input order of the certain pattern elements and the fixed characters is ascertained. The ascertained one-time-password derivation rule 102b is stored on the password storage section 102 in associated relation with the user ID 102a of the user. Preferably, the initial registration Web page is configured to allow software necessary for the off-line two-factor authentication client 151, such as the presentation-pattern creation module 151c3 and/or the client-ID acquisition module 151c4, to be downloaded therefrom. This makes it possible to form the pattern-element-sequence creation section 155 and/or the client-ID acquisition section 171 in any PC accessing the initial registration Web page so as to allow the PC to operate as an off-line two-factor authentication client 151.

When the off-line two-factor authentication client 151 accesses the off-line authentication support server 101 to register his/her user ID 102a and one-time password derivation rule 102b, the client-ID acquisition section 171 is activated to acquire a client ID 102c acquirable by the off-line two-factor authentication client 151, and transmit the client ID 102c to the off-line authentication support server 101. This operation may be performed before or after the registration of the client ID 102c and the one-time password derivation rule 102b. During the operation, the initial registration Web page selectably displays various acquisition sources for a client ID 102c (such as a CPU, a MAC address, a hard disk, a GUID or product ID or product key of Windows® OS, an IP address, a USB memory, a wireless communication data card, a portable phone, a BlueTooth® or wireless LAN-equipped device, Felica®, RFID, a biological authentication information reader, and a device having the client-ID storage section 172). In this case, it is preferable to scanningly ascertain a client ID acquirable by the client-ID acquisition section 171, via the bus and the external/network IF so as to display only an acquisition source which allows a client ID to be acquired therefrom. Alternatively, an administrator of the two-factor user authentication system 100 may pre-set one or more acquisition sources for a client ID 102c to omit the selection of an acquisition source by a user. When the user selects one of the displayed acquisition sources, a client ID 102c is read from the selected acquisition source by the client-ID acquisition section 171. It is understood that the user may select two or more of the acquisition sources. In this case, a plurality of types of client IDs 102c from the selected acquisition sources may be simultaneously combined with a pattern seed value 183 to create a presentation pattern 191, so that the number of authentication factors can be substantially increased up to three or more. The read client ID 102c is transmitted to the off-line authentication support server 101. Then, the off-line authentication support server 101 stores and registers the received client ID 102c on the password storage section 102 in associated relation with the user ID 102a and the one-time-password derivation rule 102b of the user. After completion of the above registration operation, the off-line authentication support server 101 becomes able to create verification data 194 for authentication for the user, and thereby the user becomes able to obtain authentication based on the two-factor user authentication system 100. It is preferable that, in connection with registration of a client ID 102c, information about an acquisition source for the client ID 102c is stored on an appropriate storage area. This is because, when the user is subjected to authentication, the acquisition source for the client ID 102c can be automatically set using the stored acquisition-source information. The acquisition-source information may be stored on a given storage area provided in the storage device 151c of the off-line two-factor authentication client 151, in associated relation with the user ID 102a of the user.

Then, one of the users who requests authentication, i.e., a requesting user, enters his/her user ID as a requesting-user ID 181 through the user-ID input section 152 in the off-line two-factor authentication client (Step 103). Typically, under the condition that the off-line two-factor authentication client 151 is connected to the domain network, the requesting user enters his/her user ID into the user name input field, and a domain name in the logon target input field to make a request for user authentication. Through this operation, the requesting-user ID 181 is entered into the off-line two-factor authentication client 151. Then, the logon authentication screen 197B is displayed, and a user authentication process is performed in the same manner as that in the conventional user authentication process. If the user is successfully authenticated, the verification-data request section 153 in the off-line two-factor authentication client 151 transmits a request for creating and outputting verification data 194 to the off-line authentication support server 101 together with the entered requesting-user ID 181 (Step S105). Typically, the logon module "SmxGinaDLL" operating to display the logon authentication screens 197 A, 197B accesses a resource for outputting the verification data 194 provided on a network by the off-line authentication support server 101 to send thereto data about the verification-data request including the requesting-user ID 181. Typically, the resource is Java® servlet accessible by a HTTPS protocol. Then, the request receiving section 103 in the off-line authentication support server 101 receives the verification-data request including the requesting-user ID 181 transmitted from the off-line two-factor authentication client 151 (Step S107). Typically, the off-line authentication support server 101 activates the user-authentication support application 101c2, and receives the verification-data request including the requesting-user ID 181 according to the user-authentication support application 101c2. Then, the pattern-seed-value generation section 104 in the off-line authentication support server 101 generates a plurality of pattern seed values 190 in accordance with a given generation rule (Step S109). Typically, the given generation rule is to generate random numbers within a given range. As one example of the pattern seed value 183, FIG. 5 illustrates "284E17 - - - 39D0" expressed in hexadecimal. For example, the pattern seed value 183 may be expressed by a numeric sequence having a given bit length, such as 16-byte. In this case, the given range is a range of "0000000000000000" to "FFFFFFFFFFFFFFFF" in hexadecimal. Thus, the number of different presentation patterns 191 to be created can be increased up to the number of pattern seed values included in the given range.

Then, the verification code generation section 106 in the off-line authentication support server 101 applies the pre-stored one-tome password derivation rule 102b associated with the requesting-user ID 181 to respective sets of pattern elements comprised in a plurality of presentation patterns 191 formed from a plurality of pattern element sequences 190 created based on the plurality of generated pattern seed values 183 and the pre-stored client ID 102c associated with the requesting-user ID 181 and in accordance with a given pattern-element sequence creation rule, and subjecting respective obtained results to a one-way function algorithm to creates a plurality of verification codes 193 (Step S111). The given pattern-element-sequence creation rule means a rule for creating a pattern element sequence uniquely specified based on a combination of the pattern seed value 183 and the client ID 102c, in such a manner as to provide significant difficulty in inferring the original requesting-user ID 181 and pattern seed value 183 from only the pattern element sequence. Typically, the given pattern-element-sequence creation rule is based on an encryption algorithm using the combination of the pattern seed value 183 and the client ID 102c as a sort of initial value, as described in more detail below. FIG. 6 is a conceptual diagram illustrating a process of creating a presentation pattern 191. In FIG. 5, a pattern element sequence 190 is created based on "284E17 - - - 39D0" as a pattern seed value 183 and "C8E30B178422" as a client ID 190. For this purpose, a given numeric sequence is uniquely created based on the combination of the pattern seed value 183 and the client ID 102c. In an example indicated by the uppermost row and the second row in FIG. 6, the combination of the pattern seed value 183 and the client ID 102c each expressed in hexadecimal are combined together to create a given numeric sequence. Alternatively, the pattern seed value 183 and the client ID 102c may be combined together using any suitable operation, such as addition, subtraction and/or exclusive-OR operation. Then, the given numeric sequence is subjected to an encryption algorithm to create a bit sequence 184 having a given bit length. In FIG. 5, the given bit length is 256 bits which is an information amount enough to create a presentation pattern 191 consisting of sixty four numerals. The encryption algorithm may be any suitable type capable of practically precluding an original numeric sequence from being derived from an algorithmic result, such as a hash function algorithm or a symmetric-key encryption algorithm. For example, SHA-256 may be used as a hash function to encrypt the given numeric sequence so as to create a bit sequence 184 of 256 bits. Alternatively, the Advanced Encryption Standard (AES) algorithm may be used as a symmetric-key encryption algorithm to create a key from the given numeric sequence, and encrypt a 256-bit numeric sequence appropriately pre-set using the key so as to create a bit sequence 184 of 256 bits. Further, a hash function algorithm and a symmetric-key encryption algorithm may be used in combination. The values "0111001011001101 - - - 11010" of the bit sequence 184 in FIG. 6 are shown as one example for illustrative purposes, but not shown as an accurate algorithmic result of the SHA-256 algorithm. Then, the bit sequence 184 of 256 bits is transformed to a seventy seven-digit decimal numeral, and a sixty four-digit numeral is extracted therefrom and used as a pattern element sequence 190. The values "38064655 - - - 1017" of the patter element sequence 190 in FIG. 5 are shown as one example for illustrative purposes, but not shown as an accurate result of the conversion/extraction. The sixty four-digit numeral may be extracted by eliminating unnecessary higher-order bits or lower-order bits, or using any suitable calculation, such as subtraction. The one-tome password derivation rule 102b is applied to respective sets of pattern elements comprised in a plurality of presentation patterns 191 formed from a plurality of pattern element sequences 190 created in accordance with the above given pattern-element-sequence creation rule so as to creates a plurality of proper one-time passwords, and the respective one-time passwords are subjected to a one-way function algorithm to creates a plurality of verification codes 193. Then, the pattern-seed-value transmission section 105 in the off-line authentication support server 101 transmits the plurality of generated pattern seed values 183 to the off-line two-factor authentication client 151 (Step S113). Typically, the off-line authentication support server 101 activates the user-authentication support application 101c2, and transmits the plurality of generated pattern seed values 183 to the off-line two-factor authentication client 151 according to the user-authentication support application 101c2. Then, the pattern-seed value receiving section 154 in the off-line two-factor authentication client 151 receives the plurality of pattern seed values 183 transmitted from the off-line authentication support server 101, and stores the plurality of received pattern seed values 183 in the verification data storage section 161 in associated relation with the requesting-user ID 181 (Step S115). Typically, the logon authentication module "SmxGinaDLL" running on the off-line two-factor authentication client 151 receives and stores the plurality of pattern seed values 183. Then, the verification-code transmission section 111 in the off-line authentication support server 101 transmits the plurality of generated verification codes 193 to the off-line two-factor authentication client 151 (Step S117). Typically, the off-line authentication support server 101 activates the user-authentication support application 101c2, and transmits the plurality of verification codes 193 to the off-line two-factor authentication client 151 according to the user-authentication support application 101c2. Then, the verification-code receiving section 162 in the off-line two-factor authentication client 151 receives the plurality of verification codes 193 transmitted from the off-line authentication support server 101, and stores the plurality of received verification codes 193 in the verification-data storage section 161 in associated relation with respective ones of the pattern seed values 183 stored therein (Step S119). Typically, the logon authentication module "SmxGinaDLL" running on the off-line two-factor authentication client 151 receives and stores the plurality of transmitted verification codes 193. Through the above operations, the verification data 194 corresponding to the requesting-user ID 181 is stored in the off-line two-factor authentication client 151, and the preparation for off-line user authenticate is completed.

The verification-data request may be entered directly into the off-line authentication support server 101. In this case, the verification-data request including the requesting-user ID 181 is entered into the off-line authentication support server 101, and corresponding verification data 194 is output to a recording medium or the like. The off-line two-factor authentication client 151 reads the verification data 194 from the recording medium, and stores the verification data 194.

[Operation II of Off-Line Two-Factor User Authentication System 100: User Authentication]

The operational flow for user authentication in the off-line state will be described below. FIG. 4 is a flowchart illustrating the operation for off-line user authentication in the off-line two-factor user authentication system 100. Firstly, one of the users who requests authentication, i.e., a requesting user, enters his/her user ID into the off-line two-factor authentication client 151 through the user ID input section 156 (Step S251). Typically, under the condition that the off-line two-factor authentication client 151 is not connected to the domain network, the user enters his/her user ID into the user name input field, and designates a domain or computer name using the logon target input field in the Windows® logon authentication screen 197A to make a request for user authentication and enter the requesting-user ID 181. Then, the pattern-seed-value selection section 163 in the off-line two-factor authentication client 151 checks whether the requesting-user ID 181 is included in the stored user ID 102a in the verification-data storage section 161 (Step S213). Through this step, it is determined that the verification data 194 corresponding to the requesting user is stored and thereby off-line user authentication can be performed. Then, the pattern-seed value selection section 163 in the off-line two-factor authentication client 151 selects one of the plurality of pattern seed values 183 associated with the requesting-user ID 181 in accordance with a given rule (Step S155). Preferably, as for the pattern seed value 183 to be selected, any one of the pattern seed values 183 which has already been selected for use in authentication for the user is not repeatedly selected, until new verification data is subsequently acquired from the off-line authentication support server 101 and stored. This makes it possible to display a different presentation pattern 191 for each off-line user authentication so as to protect against brute-force attack to provide enhanced security. For example, when 100 pattern seed values 183 are stored, off-line user authentication can be continuously performed 100 times before acquisition of new verification data 194. This system may be designed to indicate a warning when the number of remaining pattern seed value becomes few. However, if all of the pattern seed values 183 are selected, new user authentication cannot be performed any more. Then, the verification-code determination section 162 in the off-line two-factor authentication client 151 determines one of the plurality verification codes 193 associated with the requesting-user ID 181, which corresponds to the pattern seed value 183 selected in Step S155 (Step S157). Then, the off-line two-factor authentication client 151 prompts the user to select at least one of a plurality of acquisition sources for a client ID 102c, and the client-ID acquisition section 171 acquires a client ID 102c from the selected acquisition source (Step S159). In cases where an acquisition source is registered in connection with registration of the client ID 102c, and stored on a given area in the storage device 151c, an acquisition source for a client ID 102c is automatically sets based on information about the stored acquisition source in the off-line two-factor authentication client 151. In this case, it is not necessary for the user to select at least one of a plurality of acquisition sources for a client ID 102c. Then, the pattern-element-sequence creation section 155 in the off-line two-factor authentication client 151 creates a pattern element sequence 190 for forming a presentation pattern 191, based on the pattern seed value 183 selected in Step S157 and the client ID 102c acquired in Step S159 and in accordance with a given pattern-element-sequence creation rule (Step S161). This given pattern-element-sequence creation rule is identical to that described in Step S111. Then, the pattern display section 155 in the off-line two-factor authentication client 151 creates an image representing a presentation pattern 191 formed by arranging the pattern elements of the pattern element sequence 190, respectively, at matrix positions in the given pattern format consisting of four 4-by-4 matrixes, and displays the image on the screen of the off-line two-factor authentication client 151 (Step S163). Typically, as shown in FIG. 9, in addition to the logon authentication screen 197A, the logon authentication screen 197B including the presentation pattern 191 is displayed.

Then, the requesting user selects certain pattern elements (certain ones of one-digit numerals 0 to 9) at specific positions in the presentation pattern 191 displayed on the screen of the off-line two-factor authentication client 151, while entering one or more characters, such as numeral, without being based on the presentation pattern 191, in order, so as to create a one-time password 192 as a result of applying the one-time-password derivation rule 102b of the user to the displayed presentation pattern 191, and enters the created one-time password to the off-line two-factor authentication client 151. The one-time-password input section 156 in the off-line two-factor authentication client 151 allow the user to enter the created one-time password 192 (Step S161).

Then, the user authentication section 165 in the off-line two-factor authentication client 151 compares a value obtained by subjecting the entered one-time password 192 to the same one-way function algorithm as that used in creating the verification codes 193, with the determined verification code 193, and, if then are identical to one another, determines that the user is successfully authenticated (Step S167). If the authentication is successfully concluded, the use of a service depending on the user authentication modes will be authorized as follows. In a Windows® logon authentication, Windows® is activated and an environment corresponding to the user is provided.

As a prerequisite to allowing a plurality of types of client IDs 102c to be simultaneously combined with a pattern seed value 183 so as to create a presentation pattern 191 in order to substantially increase the number of authentication factors up to three or more, the above embodiment of the present invention may be modified to use a plurality of types of client IDs in the means or step in which a client ID 102c is handled. Specifically, the off-line two-factor user authentication system mat be configured as follows: the password storage section 102 pre-stores respective user IDs of the users, respective one-time-password derivation rules of the users, and respective client ID groups of the clients to be used by the respective users as the off-line two-factor authentication client 151, in associated relation with each other on a user-by-user basis, wherein each of the client ID groups consists of a plurality of types of client IDs 102c; the pattern-seed-value generation section 104 is operable, in accordance with the given generation rule, to generate a pattern seed value adapted to uniquely specify a presentation pattern in combination with one of the client ID groups; the client-ID acquisition section 171 is operable to acquire the client ID group 102c of the off-line two-factor authentication client 151 when used by the requesting user; the pattern-element-sequence creation section 155 is operable, based on the selected pattern seed value 183 and the acquired client ID group and in accordance with the given pattern-element-sequence creation rule, to create a pattern element sequence 190; and the verification-code creation section 106 is operable to apply the pre-stored one-time-password derivation rule associated with the received user ID to respective sets of pattern elements comprised in a plurality of presentation patterns formed from a plurality of pattern element sequences created based on the generated pattern seed values and the pre-stored client ID group 102c associated with the received user ID and in accordance with the given pattern-element-sequence creation rule, and subject respective obtained results to the one-way function algorism to create a plurality of verification codes.

In the above operational flow, as long as any inconsistency in operational flow, such as a situation where data obviously unusable in a certain step is used in the step, does not occur, the operational flow may be freely modified.

The preferred embodiment of the present invention has been described for illustrative purposes, but the present invention is not limited to the specific embodiment. It is obvious to those skilled in the art that various changes and modifications may be made therein without departing from the spirit and scope thereof as set forth in appended claims.

EXPLANATION OF CODES

100: off-line two-factor user authentication system
101: off-line authentication support server
101a: CPU
101b: RAM
101c: storage device
101c1: OS
101c2: user-authentication support application
101d: user interface (user I/F)
101e: external/network interface (external/network I/F)
102: password storage section
102a: user ID
102b: one-time-password derivation rule
102c: client ID
103: request receiving section
104: pattern-seed-value generation section
105: pattern-seed-value transmission section
106: verification-code creation section
111: verification-code transmission section
151: off-line two-factor authentication client
151a: CPU
151b: RAM
151c: storage device
151c1: OS
151c2: verification-data request module
151c3: seed-value selection/pattern creation module
151c4: verification-code determination/authentication module
151c5: client ID acquisition module
151d: user interface (user I/F)
151e: external/network interface (external/network I/F)
152: user-ID input section
153: verification-data request section
154: pattern-seed-value receiving section
155: pattern-element-sequence creation section
156: pattern display section
157: one-time-password input section
161: verification-data storage section
162: verification-code receiving section
163: pattern-seed-value selection section
164: verification-code determination section
165: user authentication section
171: client-ID acquisition section
172: client-ID storage section
181: requesting-user ID
183: pattern seed value
184: bit sequence
190: pattern element sequence
191: presentation pattern
191p: given pattern format
192: one-time password
193: verification code
196: keyboard
197A: logon authentication screen
197B: logon authentication screen

What is claimed is:

1. An off-line two-factor user authentication system designed to use a one-time-password derivation rule as a password of a user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions, so as to create a one-time password, and further use information identifying the client being used by the user, as a second authentication factor, the off-line two-factor user authentication system comprising:

an off-line authentication support server for supporting off-line authentication of a plurality of the users, the off-line authentication server comprising a processor and a memory to perform information processing; and a plurality of the clients, each comprising a processor and a memory to perform information processing, and each serving as an off-line two-factor authentication client which is a terminal capable of authenticating each of the users in an off-line state of being not network-connected although being connectable to the off-line authentication support server via a network, the off-line two-factor authentication client including:

user-ID input section operable to allow each of the users to enter his/her user ID therefrom; and user-ID transmission section operable to transmit the entered user ID to the off-line authentication support server, wherein the off-line authentication support server includes:

a password storage section pre-storing respective user IDs of the users, respective one-time-password derivation rules of the users, and respective client IDs of the clients to be used by the respective users as the off-line two-factor authentication client, in associated relation with each other on a user-by-user basis;

pattern-seed-value generation section operable, in accordance with a given generation rule, to generate a plurality of pattern seed values each adapted to uniquely specify a presentation pattern in combination with one of the client IDs;

user-ID receiving section operable to receive the user ID of one of the users who requests authentication, from the off-line two-factor authentication client;

verification-code creation section operable to apply the pre-stored one-time-password derivation rule associated with the received user ID to respective sets of pattern elements comprised in a plurality of presentation patterns formed from a plurality of pattern element sequences created based on the generated pattern seed values and the pre-stored client ID associated with the received user ID and in accordance with a given pattern-element-sequence creation rule, and subject respective obtained results to a one-way function algorism to create a plurality of verification codes;

pattern-seed-value transmission section operable to transmit the plurality of generated pattern seed values to the off-line two-factor authentication client of the requesting user; and verification-code transmission section operable to transmit the plurality of created verification codes to the off-line two-factor authentication client of the requesting user, and wherein the off-line two-factor authentication client further includes:

pattern-seed-value receiving section operable to receive the plurality of pattern seed values transmitted from the off-line authentication support server;

pattern-seed-value storage section adapted to store the plurality of received pattern seed values;

verification-code receiving section operable to receive the plurality of verification codes transmitted from the off-line authentication support server;

verification-code storage section adapted to store the plurality of received verification codes in associated relation with corresponding ones of the pattern seed values;

pattern-seed-value selection section operable to select one of the plurality of pattern seed values stored in the pattern-seed-value storage section, to allow the selected pattern seed value to be used in authenticating the user;

verification-code determination section operable to determine one of the plurality of verification-codes which corresponds to the selected pattern seed value;

client-ID acquisition section operable to acquire the client ID of the off-line two-factor authentication client when used by the requesting user;

pattern-element-sequence creation section operable, based on the selected pattern seed value and the acquired client ID and in accordance with the given pattern-element-sequence creation rule, to create a pattern element sequence;

pattern display section operable to arrange the pattern elements comprised in the created pattern element sequence, in the given pattern format to create a presentation pattern, and display the created presentation pattern on a screen;

one-time-password input section operable to allow the requesting user to enter therefrom a one-time password created as a result of applying the one-time-password derivation rule of the requesting user to the pattern elements comprised in the displayed presentation pattern; and user authentication section operable to compare a result of subjecting the entered one-time password to the one-way function algorithm with the determined verification code, and, if they are identical to one another, to determine that the user is successfully authenticated, off-line.

2. The off-line two-factor user authentication system as defined in claim 1, wherein:

the password storage section pre-stores respective user IDs of the users, respective one-time-password derivation rules of the users, and respective client ID groups of the clients to be used by the respective users as the off-line two-factor authentication client, in associated relation with each other on a user-by-user basis, wherein each of the client ID groups consists of a plurality of types of client IDs;

the pattern-seed-value generation section is operable, in accordance with the given generation rule, to generate a pattern seed value adapted to uniquely specify a presentation pattern in combination with one of the client ID groups;

the verification-code creation section is operable to apply the pre-stored one-time-password derivation rule associated with the received user ID to respective sets of pattern elements comprised in a plurality of presentation patterns formed from a plurality of pattern element sequences created based on the generated pattern seed values and the pre-stored client ID group associated with the received user ID and in accordance with the given pattern-element-sequence creation rule, and subject respective obtained results to the one-way function algorism to create a plurality of verification codes;

the client-ID acquisition section is operable to acquire the client ID group of the off-line two-factor authentication client when used by the requesting user; and the pattern-element-sequence creation section is operable, based on the selected pattern seed value and the acquired client ID group and in accordance with the given pattern-element-sequence creation rule, to create a pattern element sequence.

3. The off-line two-factor user authentication system as defined in claim 1, wherein:

the pattern-seed-value generation section is operable, in accordance with the given generation rule, to generate a pattern seed value adapted to uniquely specify a presentation pattern in combination with one of the user IDs and one of the client IDs;

the verification-code creation section is operable to apply the pre-stored one-time-password derivation rule associated with the received user ID to respective sets of pattern elements comprised in a plurality of presentation patterns formed from a plurality of pattern element sequences created based on the received user ID, the generated pattern seed values and the pre-stored client IDs associated with the received user ID and in accordance with the given pattern-element-sequence creation rule, and subject respective obtained results to the one-way function algorism to create a plurality of verification codes; and the pattern-element-sequence creation section is operable, based on the entered user ID, the selected pattern seed value, and the client ID of the off-line two-factor authentication client acquired when used by the requesting user and in accordance with the given pattern-element-sequence creation rule, to create a pattern element sequence.

4. The off-line two-factor user authentication system as defined in claim 1, wherein the client-ID acquisition section is operable to acquire identification information incorporated in hardware of the off-line two-factor authentication client.

5. The off-line two-factor user authentication system as defined in claim 1, wherein the client-ID acquisition section is operable to acquire identification information about an operating system of the off-line two-factor authentication client.

6. The off-line two-factor user authentication system as defined in claim 1, wherein the client-ID acquisition section is operable to acquire a network address set for the off-line two-factor authentication client.

7. The off-line two-factor user authentication system as defined in claim 1, wherein the client-ID acquisition section is operable to acquire identification information about an external device through an interface of the off-line two-factor authentication client.

8. The off-line two-factor user authentication system as defined in claim 1, wherein the client-ID acquisition section is operable to acquire biological identification information about the requesting user.

9. An off-line two-factor user authentication method for in a user authentication system designed to use a one-time-password derivation rule as a password of a user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions so as to create a one-time password, and further use information identifying the client being used by the user, as a second authentication factor, wherein the user authentication system includes an off-line authentication support server for supporting off-line authentication of a plurality of the users and a plurality of the clients each serving as an off-line two-factor authentication client capable of authenticating each of the users in an off-line state of being not network-connected although being connectable to the off-line authentication support server via a network, wherein the off-line authentication support server comprises a processor and a memory for performing information processing, wherein each of the plurality of clients comprises a processor and a memory for performing information processing, and wherein the off-line two-factor user authentication method comprises:

pre-storing, in the off-line authentication support server, respective user IDs of the users, respective one-time-password derivation rules of the users, and respective client IDs of the clients to be used by the respective users as the off-line two-factor authentication client, in associated relation with each other on a user-by-user basis;

allowing one of the users who requests authentication, to enter his/her user ID from the off-line two-factor authentication client;

causing the off-line two-factor authentication client to transmit the entered user ID to the off-line authentication support server;

causing the off-line authentication support server to, in accordance with a given generation rule, generate a plurality of pattern seed values each adapted to uniquely specify a presentation pattern in combination with one of the client IDs;

causing the off-line authentication support server to receive the user ID of the requesting user transmitted from the off-line two-factor authentication client;

causing the off-line authentication support server to apply the pre-stored one-time-password derivation rule associated with the received user ID to respective sets of pattern elements comprised in a plurality of presentation patterns formed from a plurality of pattern element sequences created based on the generated pattern seed values and the pre-stored client ID associated with the received user ID and in accordance with a given pattern-element-sequence creation rule, and subject respective obtained results to a one-way function algorism to create a plurality of verification codes;

causing the off-line authentication support server to transmit the plurality of generated pattern seed values to the off-line two-factor authentication client of the requesting user;

causing the off-line authentication support server to transmit the plurality of created verification codes to the off-line two-factor authentication client of the requesting user;

causing the off-line two-factor authentication client to receive the plurality of pattern seed values transmitted from the off-line authentication support server;

causing the off-line two-factor authentication client to store the plurality of received pattern seed values;

causing the off-line two-factor authentication client to receive the plurality of verification codes transmitted from the off-line authentication support server;

causing the off-line two-factor authentication client to store the plurality of received verification codes in associated relation with corresponding ones of the pattern seed values;

causing the off-line two-factor authentication client to select one of the plurality of stored pattern seed values to allow the selected pattern seed value to be used in authenticating the user;

causing the off-line two-factor authentication client to determine one of the plurality of verification-codes which corresponds to the selected pattern seed value;

causing the off-line two-factor authentication client to acquire the client ID of the off-line two-factor authentication client when used by the requesting user;

causing the off-line two-factor authentication client to create a pattern element sequence based on the selected pattern seed value and the acquired client ID and in accordance with the given pattern-element-sequence creation rule;

causing the off-line two-factor authentication client to arrange the pattern elements comprised in the created pattern element sequence, in the given pattern format to create a presentation pattern, and display the created presentation pattern on a screen;

allowing the requesting user to enter, from the off-line two-factor authentication client, a one-time password created as a result of applying the one-time-password derivation rule of the requesting user to the pattern elements comprised in the displayed presentation pattern; and causing the off-line two-factor authentication client to compare a result of subjecting the entered one-time password to the one-way function algorithm with the determined verification code, and, if they are identical to one another, to determine that the user is successfully authenticated, off-line.

10. An off-line two-factor authentication client for authenticating a user in an off-line two-factor user authentication system designed to use a one-time-password derivation rule as a password of the user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions, so as to create a one-time password, and further use information identifying the client being used by the user, as a second authentication factor, the off-line two-factor authentication client comprising:

a processor and a memory for performing information processing;

pattern-seed-value receiving section for pre-receiving a plurality of pattern seed values pre-generated in accordance with a given generation rule, and each adapted to uniquely specify a presentation pattern in combination with a client ID identifying the off-line two-factor authentication client;

pattern-seed value storage section pre-storing the plurality of pre-received pattern seed values;

verification-code receiving section for pre-receiving a plurality of verification codes pre-created by applying a one-time-password derivation rule as a password associated with a user requesting authentication to respective sets of pattern elements comprised in a plurality of presentation patterns formed from a plurality of pattern element sequences created based on the pre-generated pattern seed values and a client ID associated with a user ID of the requesting user and in accordance with a given pattern-element-sequence creation rule, and subjecting respective obtained results to a one-way function algorism;

verification-code storage section pre-storing the plurality of pre-received verification codes;

user-ID input section operable to allow the requesting user to enter his/her user ID therefrom;

pattern-seed-value selection section operable to select one of the plurality of pattern seed values pre-stored in the pattern-seed-value storage section, to allow the selected pattern seed value to be used in authenticating the user;

verification-code determination section operable to determine one of the plurality of verification-codes which corresponds to the selected pattern seed value;

client-ID acquisition section operable to acquire the client ID of the off-line two-factor authentication client when used by the requesting user;

pattern-element-sequence creation section operable, based on the selected pattern seed value and the acquired client ID and in accordance with the given pattern-element-sequence creation rule, to create a pattern element sequence;

pattern display section operable to arrange the pattern elements comprised in the created pattern element sequence, in the given pattern format to create a presentation pattern, and display the created presentation pattern on a screen;

one-time-password input section operable to allow the requesting user to enter therefrom a one-time password created as a result of applying the one-time-password derivation rule of the requesting user to the pattern elements comprised in the displayed presentation pattern; and user authentication section operable to compare a result of subjecting the entered one-time password to the one-way function algorithm with the determined verification code, and, if they are identical to one another, to determine that the user is successfully authenticated, off-line.

11. An off-line two-factor user authentication method usable with an off-line two-factor authentication client for authenticating a user in an off-line two-factor user authentication system designed to use a one-time-password derivation rule as a password of the user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions, so as to create a one-time password, and further use information identifying the client being used by the user, as a second authentication factor, wherein the off-line two-factor authentication client comprises a processor and a memory for performing information processing, and wherein the off-line two-factor user authentication method comprises:

pre-receiving a plurality of pattern seed values pre-generated in accordance with a given generation rule, and each adapted to uniquely specify a presentation pattern in combination with a client ID identifying the off-line two-factor authentication client;

pre-storing the plurality of pre-received pattern seed values;

pre-receiving a plurality of verification codes pre-created by applying a one-time-password derivation rule as a password associated with a user requesting authentication to respective sets of pattern elements comprised in a plurality of presentation patterns formed from a plurality of pattern element sequences created based on the pre-generated pattern seed values and a client ID associated with a user ID of the requesting user and in accordance with a given pattern-element-sequence creation rule, and subjecting respective obtained results to a one-way function algorism;

pre-storing the plurality of pre-received verification codes;

allowing the requesting user to enter his/her user ID therefrom;

selecting one of the plurality of pattern seed values pre-stored in the pattern-seed-value storage section, to allow the selected pattern seed value to be used in authenticating the user;

determining one of the plurality of verification-codes which corresponds to the selected pattern seed value;

acquiring the client ID of the off-line two-factor authentication client when used by the requesting user;

creating a pattern element sequence based on the selected pattern seed value and the acquired client ID and in accordance with the given pattern-element-sequence creation rule;

arranging the pattern elements comprised in the created pattern element sequence, in the given pattern format to create a presentation pattern, and displaying the created presentation pattern on a screen;

allowing the requesting user to enter, from off-line two-factor authentication client, a one-time password created as a result of applying the one-time-password derivation rule of the requesting user to the pattern elements comprised in the displayed presentation pattern; and comparing a result of subjecting the entered one-time password to the one-way function algorithm with the determined verification code, and, if they are identical to one another, determining that the user is successfully authenticated, off-line.

12. A non-transitory computer-readable medium having embodied thereon an off-line two-factor user authentication program for allowing an off-line two-factor user authentication client to execute an off-line two-factor user authentication method off-line, in an off-line two-factor user authentication system designed to use a one-time-password derivation rule as a password of the user subject to authentication, in such a manner that a plurality of pattern elements are arranged in a given pattern format and presented as a presentation pattern to a client being used by the user, and the one-time-password derivation rule is applied to certain ones of the pattern elements included in the presentation pattern at specific positions, so as to create a one-time password, and further use information identifying the client being used by the user, as a second authentication factor, the off-line two-factor user authentication method comprising:

pre-receiving a plurality of pattern seed values pre-generated in accordance with a given generation rule, and each adapted to uniquely specify a presentation pattern in combination with a client ID identifying the off-line two-factor authentication client;

pre-storing the plurality of pre-received pattern seed values;

pre-receiving a plurality of verification codes pre-created by applying a one-time-password derivation rule as a password associated with a user requesting authentication to respective sets of pattern elements comprised in a plurality of presentation patterns formed from a plurality of pattern element sequences created based on the pre-generated pattern seed values and a client ID associated with a user ID of the requesting user and in accordance with a given pattern-element-sequence creation rule, and subjecting respective obtained results to a one-way function algorism;

pre-storing the plurality of pre-received verification codes;

allowing the requesting user to enter his/her user ID therefrom;

selecting one of the plurality of pattern seed values prestored in the pattern-seed-value storage section, to allow the selected pattern seed value to be used in authenticating the user;

determining one of the plurality of verification-codes which corresponds to the selected pattern seed value;

acquiring the client ID of the off-line two-factor authentication client when used by the requesting user;

creating a pattern element sequence based on the selected pattern seed value and the acquired client ID and in accordance with the given pattern-element-sequence creation rule;

arranging the pattern elements comprised in the created pattern element sequence, in the given pattern format to create a presentation pattern, and displaying the created presentation pattern on a screen;

allowing the requesting user to enter, from off-line two-factor authentication client, a one-time password created as a result of applying the one-time-password derivation rule of the requesting user to the pattern elements comprised in the displayed presentation pattern; and comparing a result of subjecting the entered one-time password to the one-way function algorithm with the determined verification code, and, if they are identical to one another, determining that the user is successfully authenticated, off-line.

13. The non-transitory computer-readable medium as defined in claim 12, wherein the off-line two-factor user authentication program is a logon authentication program configured to be called in response to setting of a registry during a start up process of an operating system.

* * * * *